United States Patent [19]
Miyashita et al.

[11] Patent Number: 6,031,543
[45] Date of Patent: *Feb. 29, 2000

[54] IMAGE PROCESSING APPARATUS FOR CORRECTING COLOR SPACE COORDINATES AND METHOD

[75] Inventors: Naomi Miyashita; Takayuki Kanda, both of Tokyo; Masayuki Aoki, Kawasaki, all of Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/684,979

[22] Filed: Aug. 22, 1996

[30] Foreign Application Priority Data

Sep. 28, 1995 [JP] Japan ................................. 7-251663

[51] Int. Cl.[7] .......................... G06T 15/50; G06T 11/80
[52] U.S. Cl. ........................ 345/431; 345/440; 345/150; 382/167
[58] Field of Search .................................. 345/431, 150, 345/440; 382/167

[56] References Cited

U.S. PATENT DOCUMENTS 5,012,333  4/1991  Lee et al. ............................. 358/520
5,270,806  12/1993  Venable et al. ..................... 345/431 X
5,416,890  5/1995  Beretta et al. .......................... 345/431

FOREIGN PATENT DOCUMENTS 0 536 893 A2  4/1993  European Pat. Off. .
0 720 352 A1  7/1996  European Pat. Off. .

OTHER PUBLICATIONS

Wordperfect Draw, Wordperfect Corp., Fill Colour Control Method, Software issued Apr. 20, 1994.
Image Assistant, 1990–93, Image Software Inc., Colour Balance Control Method, Gradation Curve Control and Colour Wheel Hue/Saturation Selection Method.
"Corel Draw", Corel Corporation, pp. 385 and 389, 1993.
Adobe Photoshop User Guide, Adobe Systems Inc., p. 131, 1993.

*Primary Examiner*—Mark R. Powell
*Assistant Examiner*—Chante' Harrison
*Attorney, Agent, or Firm*—Staas & Halsey, LLP

[57] ABSTRACT

Color information of a color image is represented by the Lab color space. A user can change hue by moving the position of a reference circle displayed on the a*b* plane in the Lab color space and change saturation by changing the size of the reference circle. The color information of the color image is changed with changes in the reference circle, allowing the user to conjecture changes in the color image visually and make color corrections easily and quickly.

18 Claims, 41 Drawing Sheets

| | RANGE | CONVERSION EQUATION |
|---|---|---|
| L | $L^*$ $[0 \sim 100.0]$ FIXED<br>$L_{LV}$ $[0 \sim 255]$ FIXED | $L^* = 0.39215686 * (float)(L_{LV})$<br>$L_{LV} = (int)(2.55 * L^*)$ |
| a | $a^*$ $[-128.0 \sim 0 \sim 127.0]$<br>$a_{LV}$ $[0 \sim 128 \sim 255]$ | $a^* = (float)(a_{LV} - a_{OF}) * (a_{MAX} - a_{MIN})/255.0$<br>$a_{LV} = (int)((255.0/(a_{MAX} - a_{MIN})) \cdot a^*) + a_{OF}$ |
| b | $b^*$ $[-128.0 \sim 0 \sim 127.0]$<br>$b_{LV}$ $[0 \sim 128 \sim 255]$ | $b^* = (float)(b_{LV} - b_{OF}) * (b_{MAX} - b_{MIN})/255.0$<br>$b_{LV} = (int)((255.0/(b_{MAX} - b_{MIN})) \cdot b^*) + b_{OF}$ |

FIG. 13

$a_{MAX} = 127.0$, $a_{MIN} = -128.0$, $a_{OF} = 128$ $b_{MAX} = 127.0$, $b_{MIN} = -128.0$, $b_{OF} = 128$

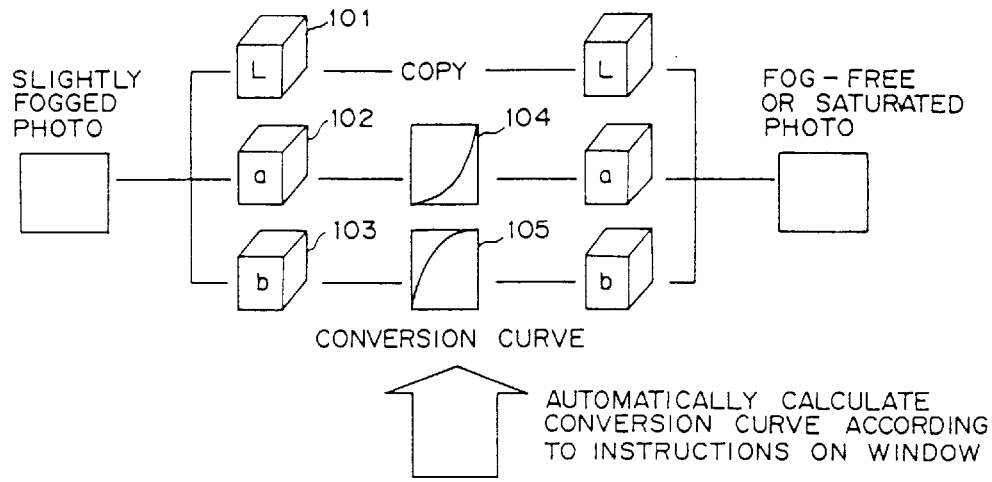
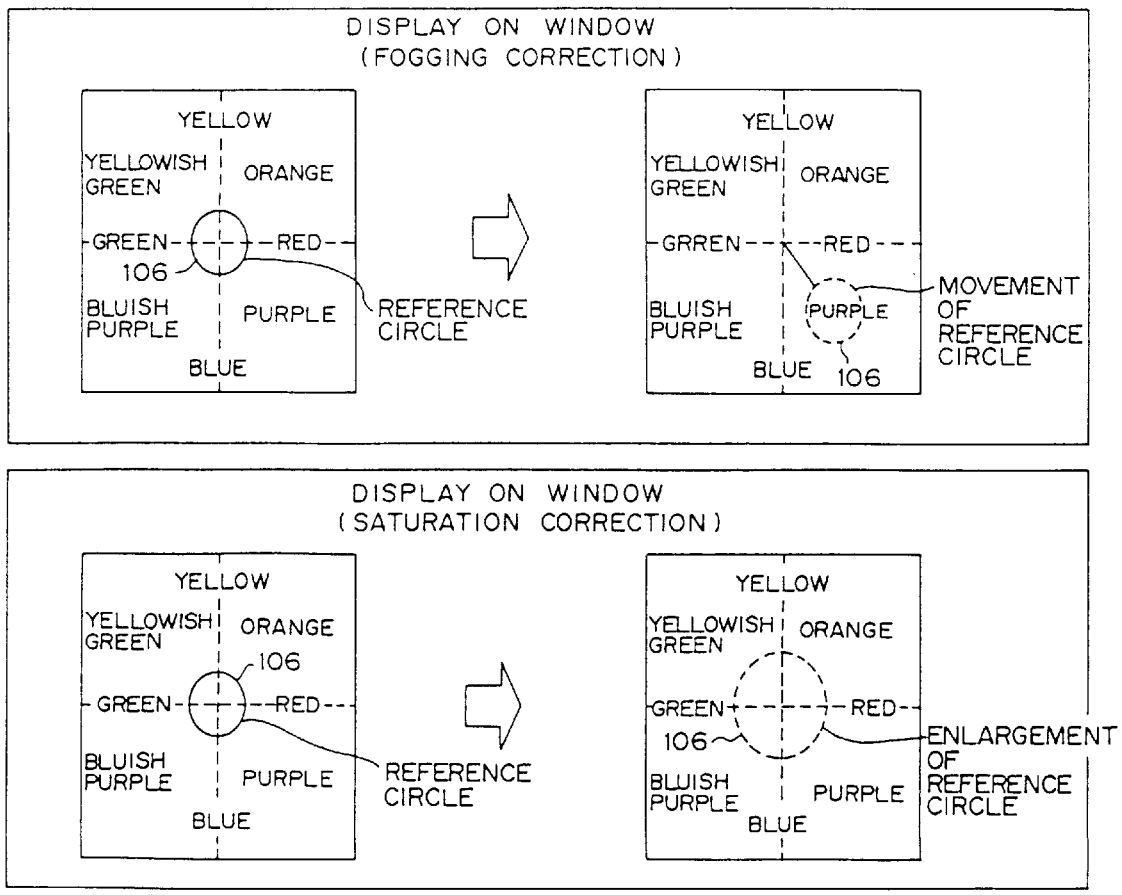
FIG. 16

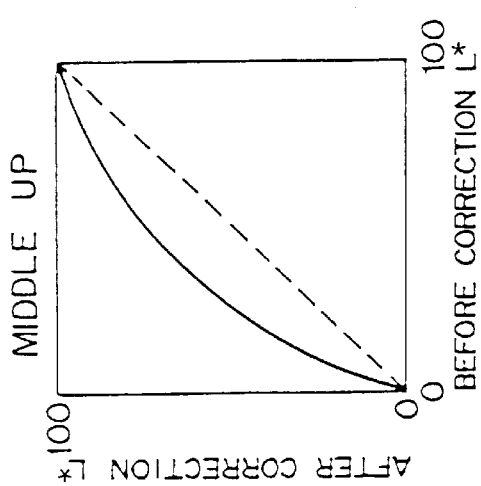
FIG. 27C MIDDLE UP
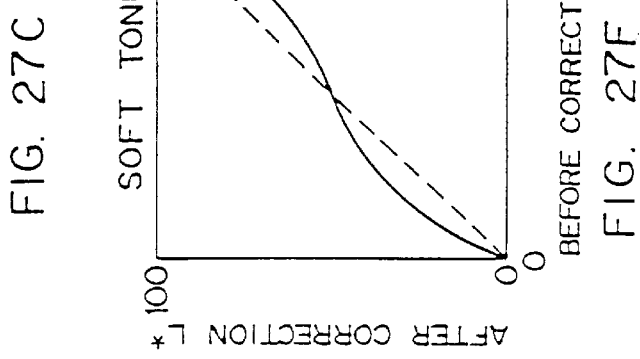
FIG. 27F SOFT TONE
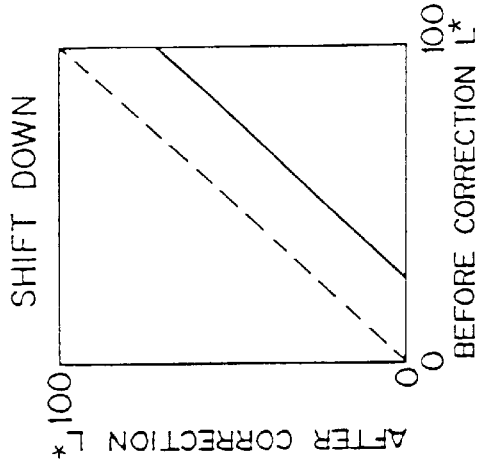
FIG. 27B SHIFT DOWN
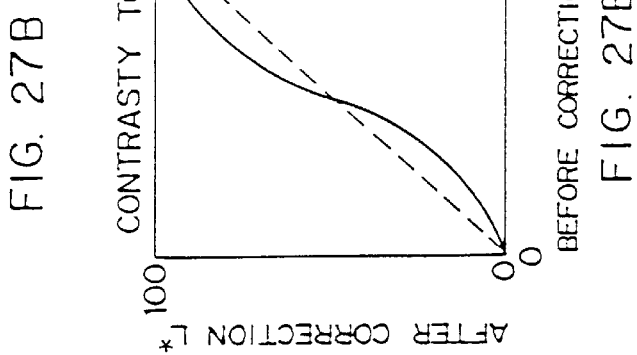
FIG. 27E CONTRASTY TONE
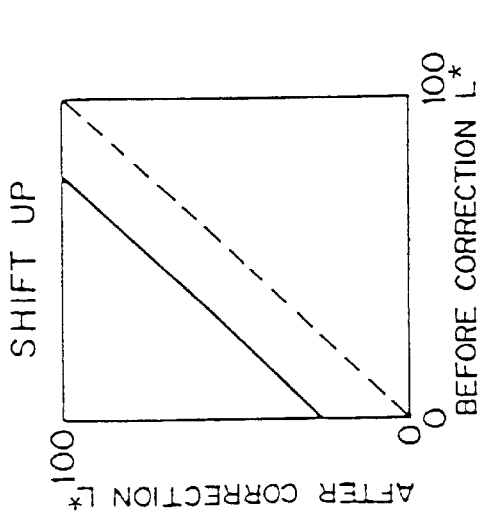
FIG. 27A SHIFT UP
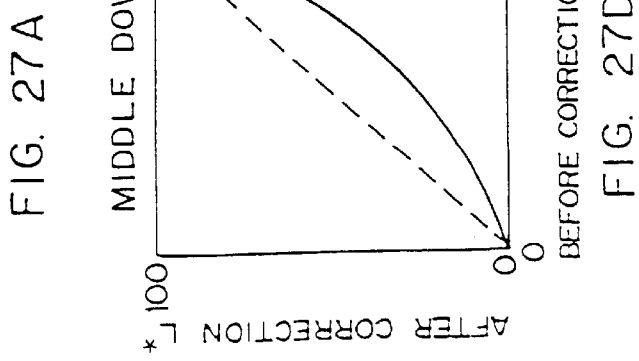
FIG. 27D MIDDLE DOWN

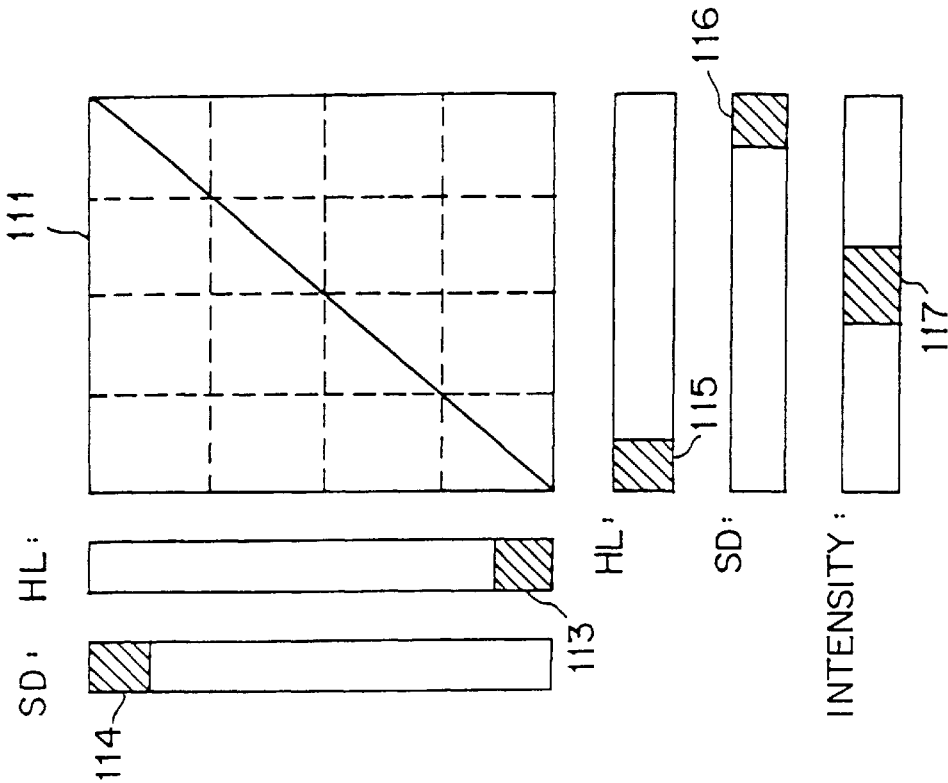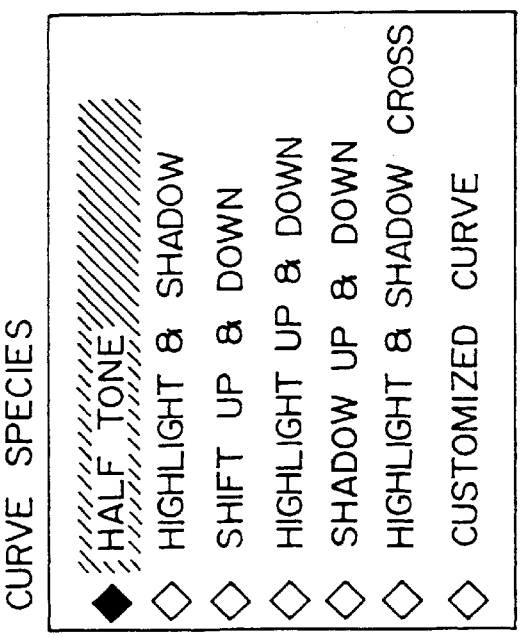
FIG. 28

IMAGE PROCESSING APPARATUS FOR CORRECTING COLOR SPACE COORDINATES AND METHOD

BACKGROUND OF THE INVENTION

1. Field of the Invention

The invention relates to a digital image processing apparatus, and more specifically to an image processor for retouching color images and a method thereof.

2. Description of the Related Art

Nowadays, digitally processed color images are frequently used as display images and still pictures appeared in printed matter. In this case, image data is frequently retouched so as to obtain vivid images. In particular, news photos need retouch processing because they are often shot under unfavorable conditions. In a conventional digital image processing apparatus, color space image data, such as RGB or CMY, is treated and each primary color in color space image data is specified numerically for retouch processing. RGB color space image data is used in visually displaying images on a display screen and CMY color space image data is used in printing images.

FIG. 1 shows an example of conventional color space image data for printing and FIG. 2 shows a method of correcting that image data. As shown in FIG. 1, in the case of image data of a color photo, the color of each pixel is specified by pixel values of the respective colors of cyan (C), magenta (M), yellow (Y), and black (K). When an original color photo is reddish or yellowish because of fogging, its color tone is corrected. In this case, as shown in FIG. 2, a conversion curve is displayed for each of colors of C, M, Y, and K and then revised to correct the color of that photo. Using image data thus converted, a fog-free color photo is produced.

However, the correction processing of RGB or CMY(K)-based color space image data has a problem that users have difficulty conjecturing the results of corrections made by specifying a numerical value for each color. That is, sophisticated image processing techniques and experience are needed, which makes it impossible for amateurs to make corrections easily. For example, in the case of color-photo correction as shown in FIG. 2, it is required for users to revise each conversion curve while recognizing changes in other colors. It is therefore difficult to provide suitable instructions to change the image data. This is the same case with RGB color space image data processing in which each color is represented by pixel values of red (R), green (G), and blue (B).

SUMMARY OF THE INVENTION

It is an object of the prevent invention to provide an image processing apparatus which allows users to retouch color images easily and quickly and a method therefor.

An image processing apparatus of the invention has a color space image storage section, an interactive display section, and a correction section.

The color space image storage section stores image data in a color space. The color space is the one which is represented by lightness information and color tone information and allows users to conjecture changes in image visually.

The interactive display section displays color information in image data stored in the color space image storage section in the form of a graph and accepts a correction instruction for the color information from a user. The graphically displayed color information is represented by the color space that is close to human sensation, e.g., the Lab color space. When making corrections on the image data, therefore, the user can conjecture changes in the color of the image easily. This allows the user to provide correction instructions easily.

The correction section corrects the image data in the color space image storage section as instructed by the user.

According to the present invention, therefore, since color information is displayed by a color space that permits changes in image to be conjectured visually, a user can makes color corrections while watching the displayed color information. This will allow the user to make color corrections on a color image easily and quickly.

BRIEF DESCRIPTION OF THE DRAWINGS

FIG. 13 is a diagram showing conversion equations for color space image data;

FIG. 16 is a diagram showing a correction method in the Lab color space;

FIGS. 27A to 27F is a diagram showing L* value correction curves;

FIG. 28 is a diagram showing an example of a process of specifying a L* value correction curve species;

DETAILED DESCRIPTION OF THE PREFFERED EMBODIMENTS

Figure 1:
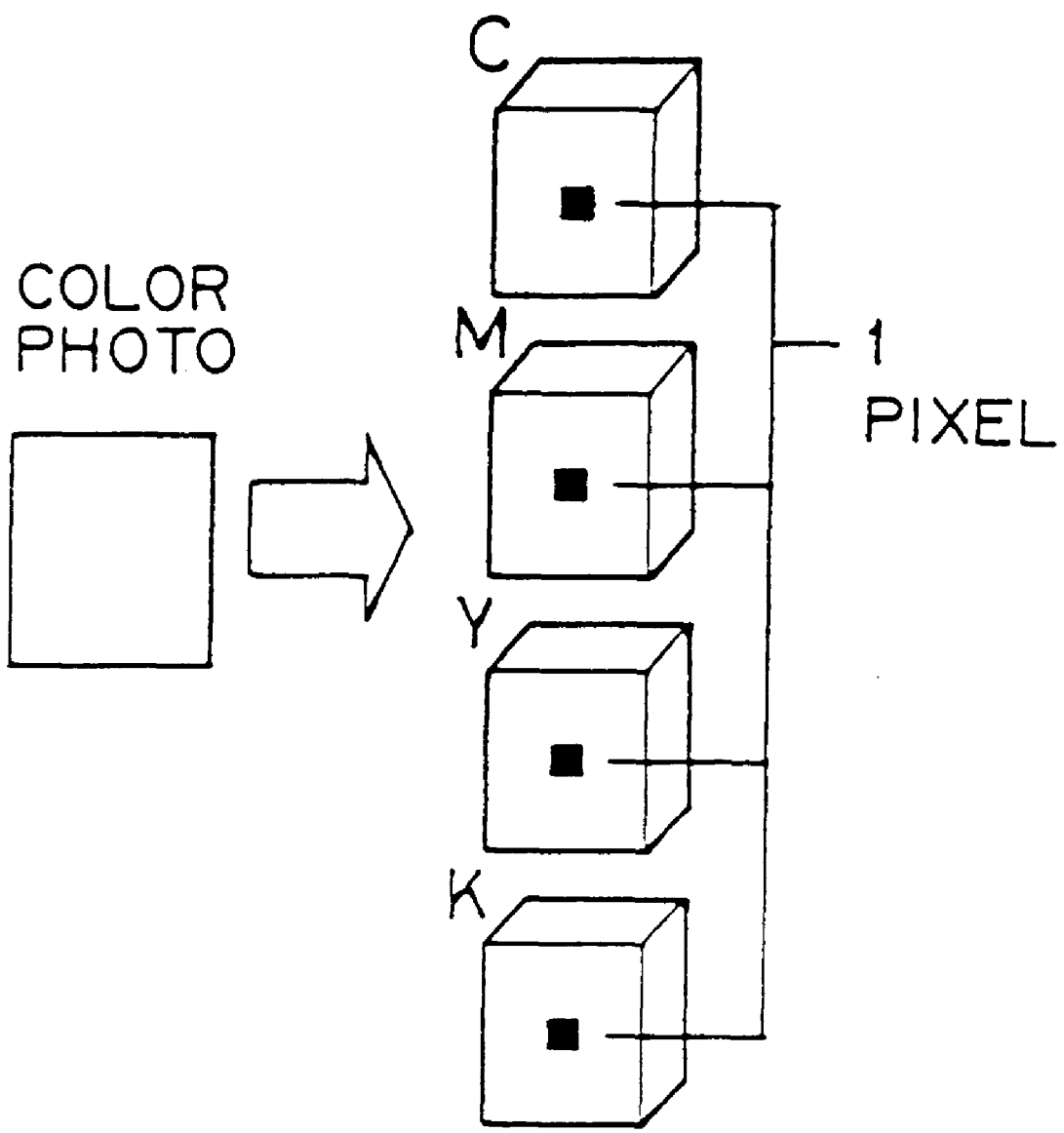
FIG. 1 is a schematic diagram showing image data in a conventional correction method.
Figure 2:
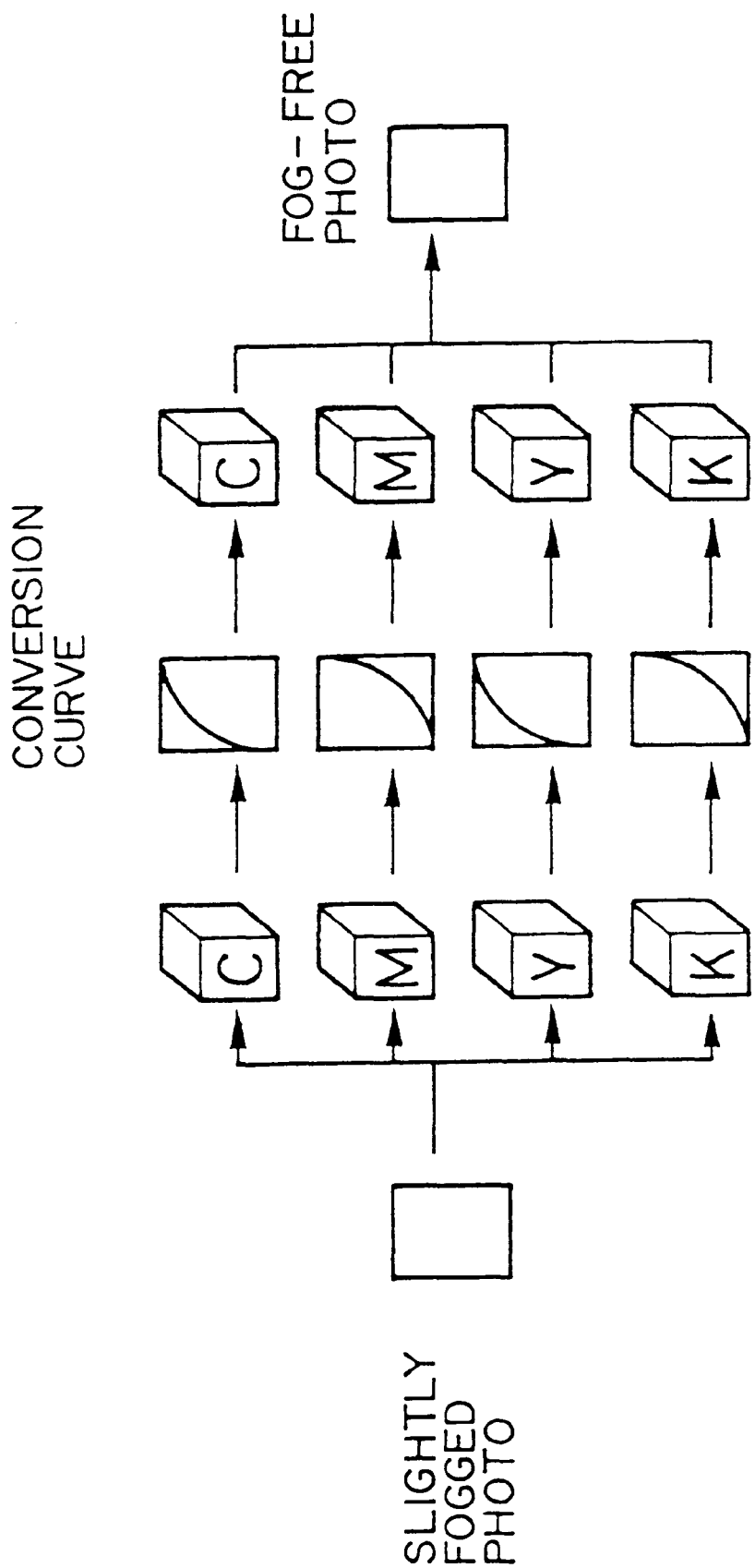
FIG. 2 is a schematic diagram showing a conventional correction method.
Figure 3:
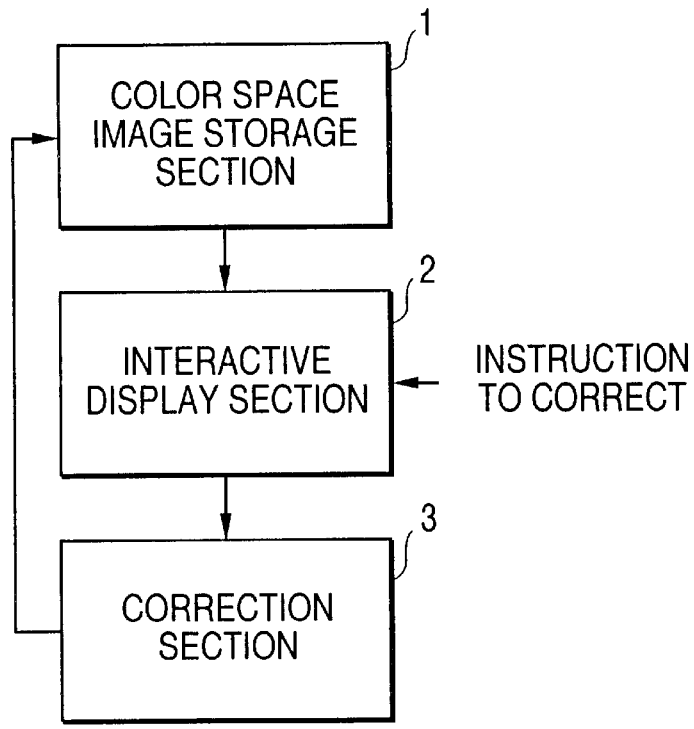
FIG. 3 is a principle block diagram of the present invention.

FIG. 3 illustrates the principle of an image processor of the present invention, which comprises a color space image storage section 1, an interactive display section 2, and a correction section 3.

The image storage section 1 stores image data in a color space which allows changes in an image to be conjectured visually.

The interactive display section 2 graphically displays color information in the image data and then accepts from the user an instruction to correct the color information.

The correction section 3 corrects the image data stored in the color space image storage section 1 on the basis of the correction instructions accepted by the interactive display section 2.

The color space image storage section 1 stores image data in the Lab color space represented by, for example, lightness information and color tone information. This color space is a three-dimensional space that comprises coordinate axes representing color information close to human sensation and allows the user to conjecture how an image will be changed by a change in each coordinate value. The interactive display section 2 visually displays such a color space and a graph representing color information in the image data. The user can easily instruct the interactive display section to correct the image data while watching that graph. The interactive display section 2 informs the correction section 3 of graph information changed by the user's correction instructions. In response to this, the correction section 3 creates a conversion table for each coordinate value and then corrects the image data.

The Lab color space represents each piece of image data in terms of a first coordinate indicating lightness information and second and third coordinates indicating color information. The interactive display section 2 displays a conversion curve for gradation conversion of the first coordinate value and a color graph on a two-dimensional plane consisting of the second and third coordinate values. Upon receipt of a lightness correction instruction from the user, the correction section 3 uses that correction curve to change the first coordinate value. In response to a color correction instruction from the user, on the other hand, the correction section 3 changes the second and third coordinate values according to a change in the color graph.

Thus, a color image can be retouched easily and quickly by displaying a color space which permits changes in image to be visually conjectured.

Figure 4:
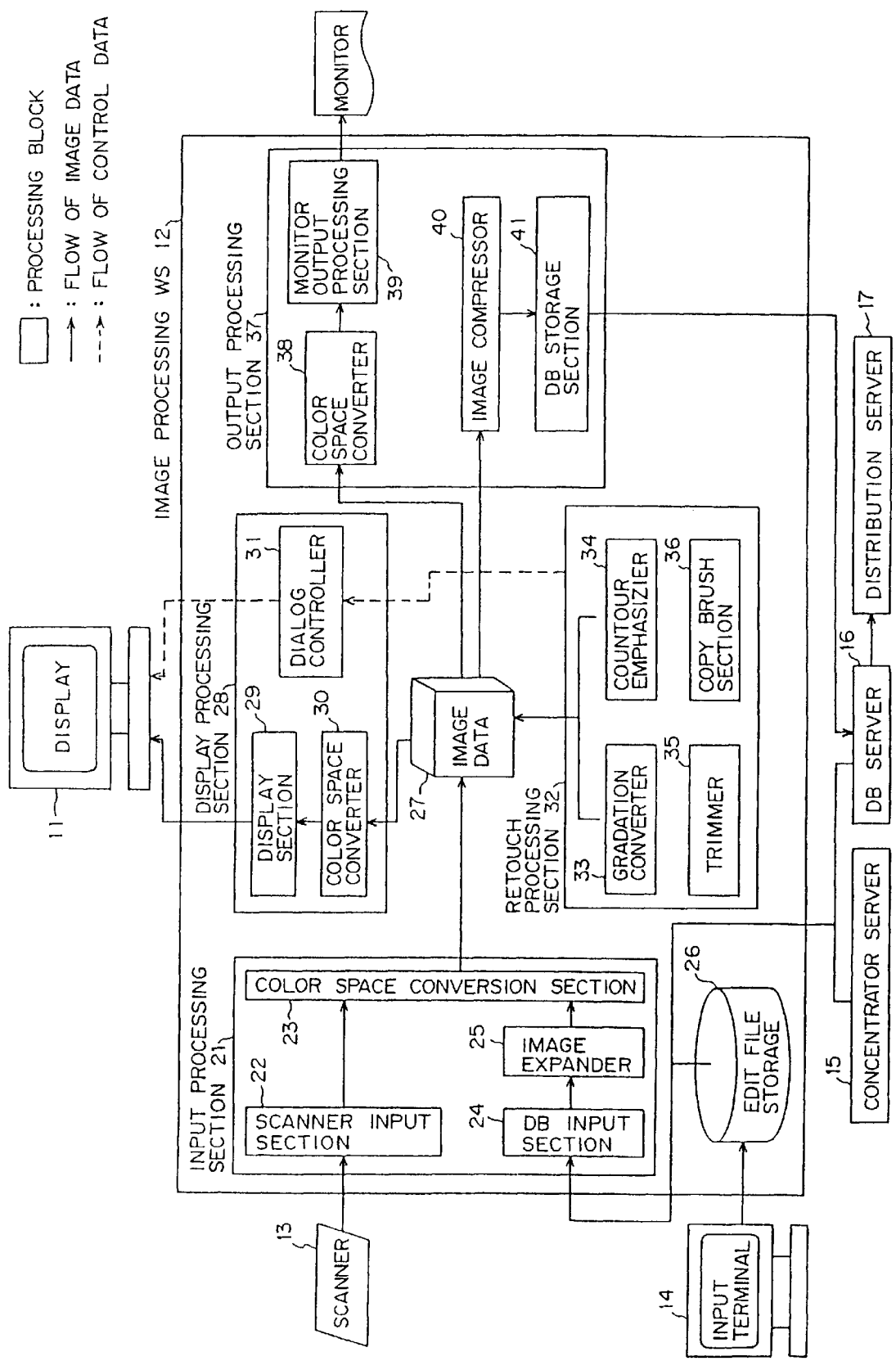
FIG. 4 is a block diagram showing the system configuration of an embodiment of the present invention.

For example, the color space image storage section 1 of FIG. 3 corresponds to a memory in an image processing work station 12 of FIG. 4 and the interactive display section 2 corresponds to a display processor 28 and the correction section 3, corresponds to a gradation converter 33 in a retouch processing section 32. The first, second and third coordinates, for example, correspond to L*, a* and b*, respectively, in FIG. 8, and the color graph corresponds to a circle graph in FIGS. 9 and 10.

Hereinafter an embodiment of the present invention will be described in detail with reference to the accompanying drawings.

FIG. 4 shows a configuration of an image processing system according to an embodiment of the present invention. In this system, an image processing workstation (WS) 12 creates image data 27 on the basis of an input from a scanner 13, an input terminal 14, a concentrator server 15, or a database (DB) server 16 and displays it on the screen of a display unit 11. In FIG. 4, continuous lines indicate the flow of image data and broken lines indicate the flow of control data.

The image processing workstation 12 is equipped with an input processing section 21, a display processing section 28, a retouch processing section 32, and an output processing section 37, which are implemented by the functions of a central processing unit (CPU). In the input processing section 21, input data entered from the scanner 13 to a scanner input section 22 has its color space information converted by a color space conversion section 23 and is then output as the image data 27. Data entered into a database input section 24 is subjected to expansion in an image expander 25 and then has its color space information converted by the color space converter 23. The image data 27 is stored in a memory (not shown) in the image processing workstation 12. An edit file storage 26 stores files input from the input terminal 14 as edit files. The edit files are fed into the database input section 24. The input files to the database input section 24 further include files delivered from the concentrator server 15 and the database server 16.

The retouch processing section 32 is equipped with various image processors including a gradation converter 33, a contour emphasizer 34, a trimmer 35, and a copy brush section 36 and processes and retouches the image data 27 as instructed by the operator.

In the display processing section 28, the image data 27 is converted by a color space converter 30 and then displayed on the display 11 by a display section 29. A dialog controller 31 controls the display of various processes performed by the retouch processing section 32.

In the output processing section 37, the image data 27 is compressed by an image compressor 40 and then stored into the database server 16 by a database storage section 41. The compressed data stored in the database server 16 can be reentered into the input processing section 21 to return to the image data 27 or can be transferred to another image processing system through a distribution server 17. The image data has its color space converted by a color space converter 38 in the output processing section 37 and is then output to a monitor through a monitor output processing section 39.

Figure 5:
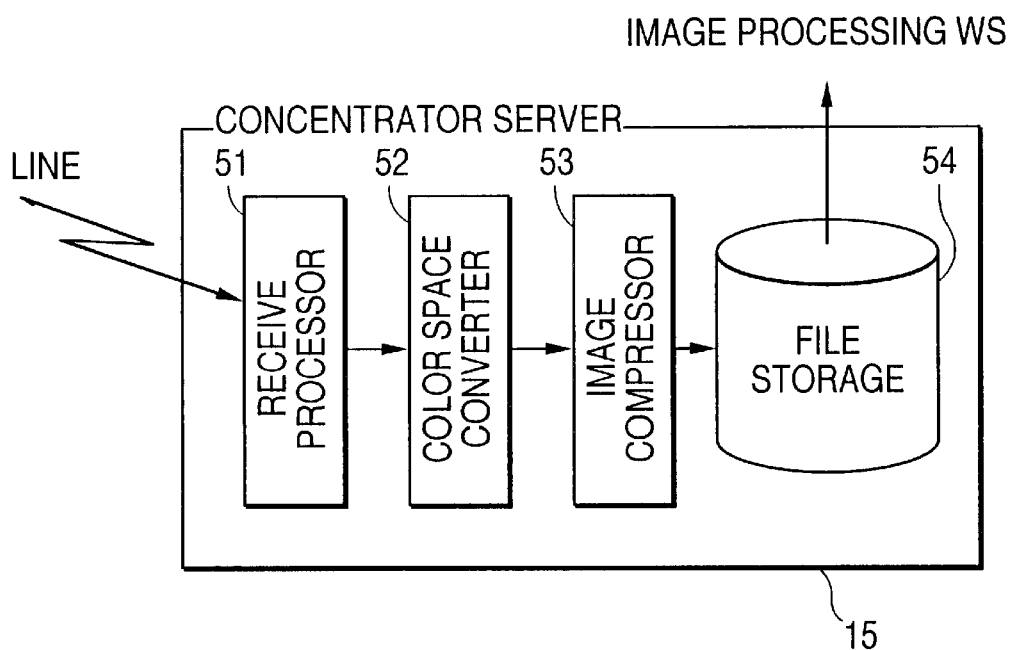
FIG. 5 is a block diagram showing the construction of the concentration server of FIG. 4.
Figure 6:
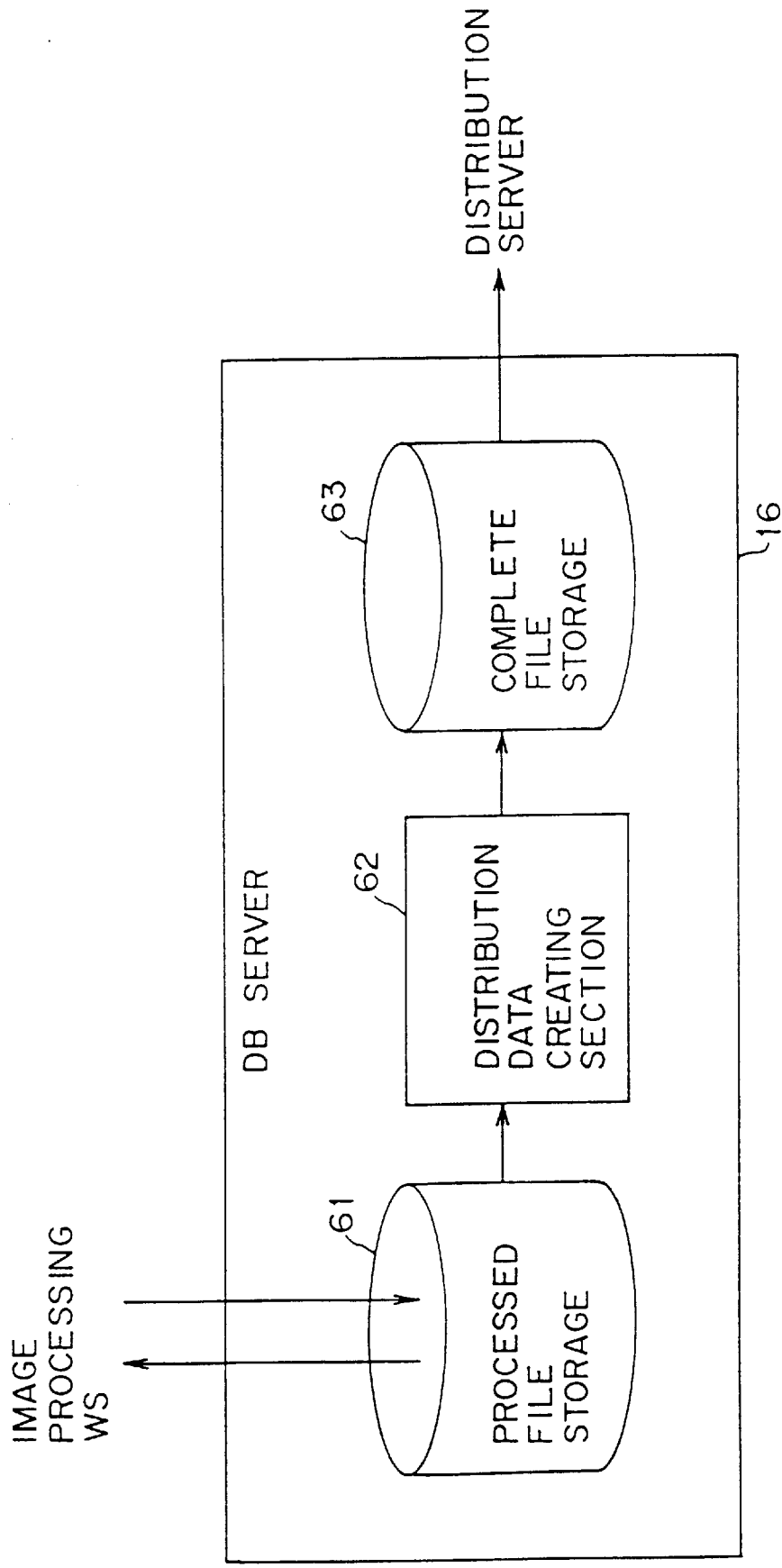
FIG. 6 is a block diagram showing the construction of the database server of FIG. 4.

FIGS. 5 and 6 show arrangements of the concentrator server 15 and the database server 16, respectively. The concentration server 15 of FIG. 5 is equipped with a receive processor 51, a color space converter 52, an image compressor 53, and a file storage 54. The receive processor 51 captures data sent from another imaging processing system over a communications line. The captured data is converted by the color space converter 52, compressed by the image compressor 53 and stored in the file storage 54. However, if the received data has already been compressed, it does not necessarily require recompression. The file stored in the file storage 54 is entered into the input processing section 21 in the image processing workstation 12.

The database server 16 of FIG. 4 is equipped with a processed file storage 61, a distribution data creating section 62, and a complete file storage 63 as shown in FIG. 6. The processed file storage 61 stores data from the output processing section 37 in the image processing workstation 12 as a file that has already been processed. The distribution data creating section 62 creates distribution data from a file in the file storage 61 and stores it as a complete file in a complete file storage 63. The complete file is output to a distribution server. The processed file may be passed to the image processing workstation 12.

Figure 7:
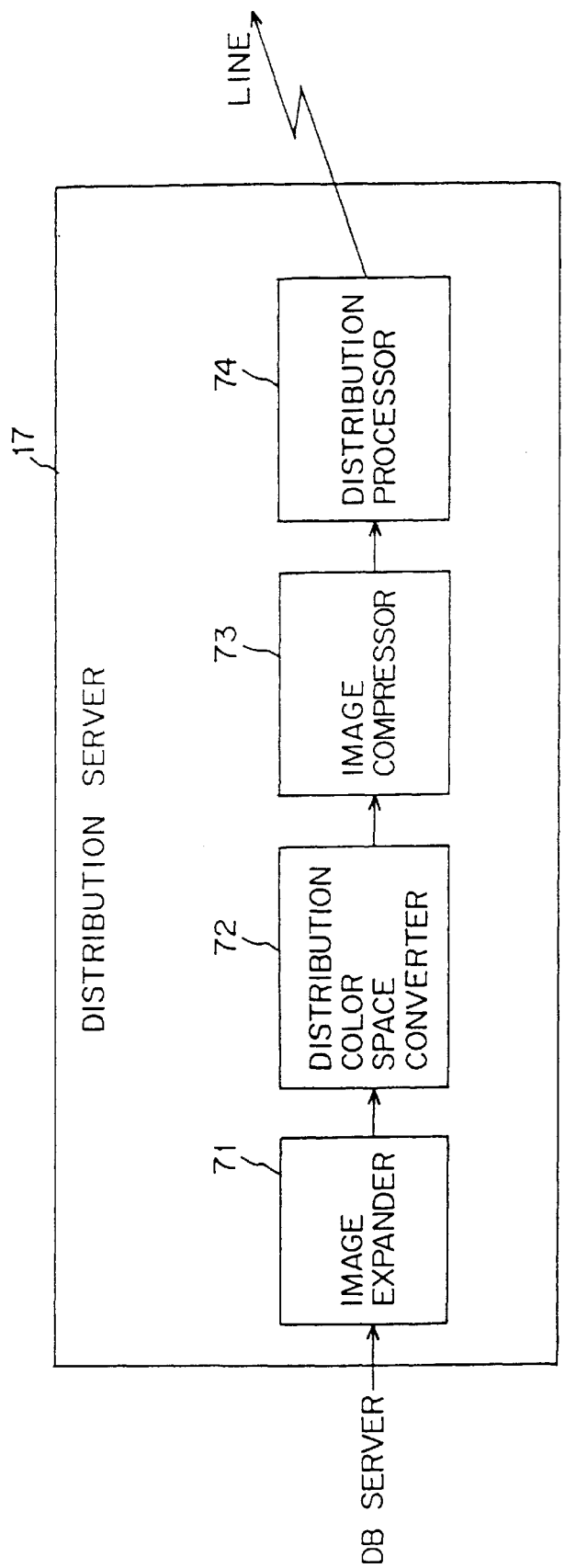
FIG. 7 is a block diagram showing the construction of the distribution server of FIG. 4.

FIG. 7 shows an arrangement of the distribution server 17, which comprises an image expander 71, a distribution color space converter 72, an image compressor 73, and a distribution processor 74. A complete file input from the database server 16 is expanded by the image expander 71, converted by the distribution color space converter 72, and compressed again by the image compressor 73. The distribution processor 74 sends the file to another image processing system over a communications line.

The arrangements of the concentration server 15 of FIG. 5, the database server 16 of FIG. 6 and the distribution server 17 of FIG. 7 are merely exemplary and not restrictive.

The present embodiment uses data defined in terms of the Lab color space as image data 27 and the JPEG baseline compression technique as the image compression technique used herein. The Lab color space is also called the CIE 1976 (L* a* b*) color space, which is a color coordinate system (uniform perceptual space) that was established by CIE (Commission International de l'Eclairage) in 1976.

Figure 8:
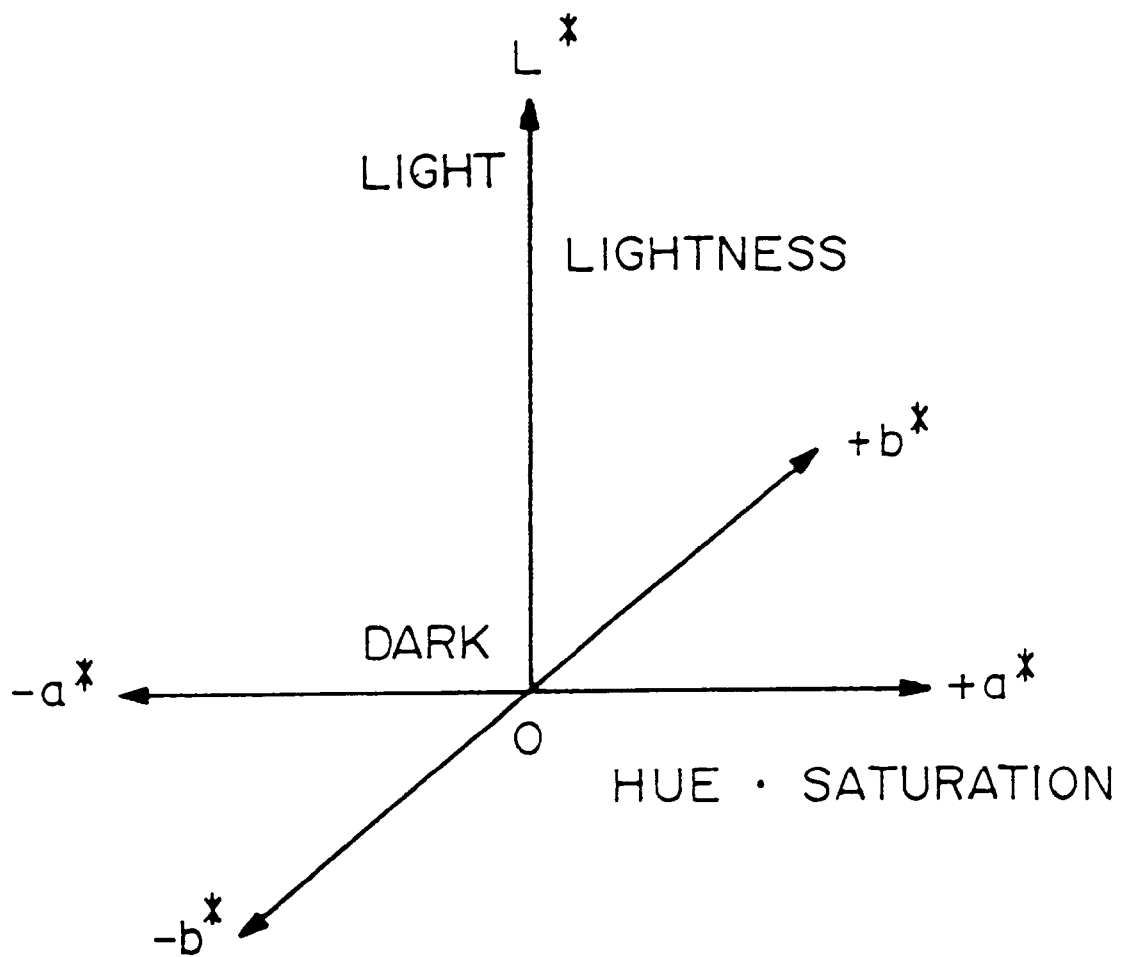
FIG. 8 is a diagram showing the Lab color space.

FIG. 8 shows the Lab color space, which is represented by an orthogonal coordinate system consisting of three axes L*, a*, and b*. In FIG. 8, L* represents lightness information. The greater the value for lightness information is, the brighter the image becomes. The paired a* and b* represent color (hue/saturation) information. Such a Lab color space represents color information that appeals directly to human vision and allows users to easily conjecture how an image will be changed by a change in each coordinate. The hue/saturation information is corrected by first representing the a* b* information by a two-dimensional graph with a* taken as the axis of abscissa and b* as the axis of ordinate and then the size and position of a circle serving as correction reference. A method of correcting the hue using the Lab color space is illustrated in FIG. 9 and a method of correcting the saturation using that hue correcting method is illustrated in FIG. 10.

Figure 9:
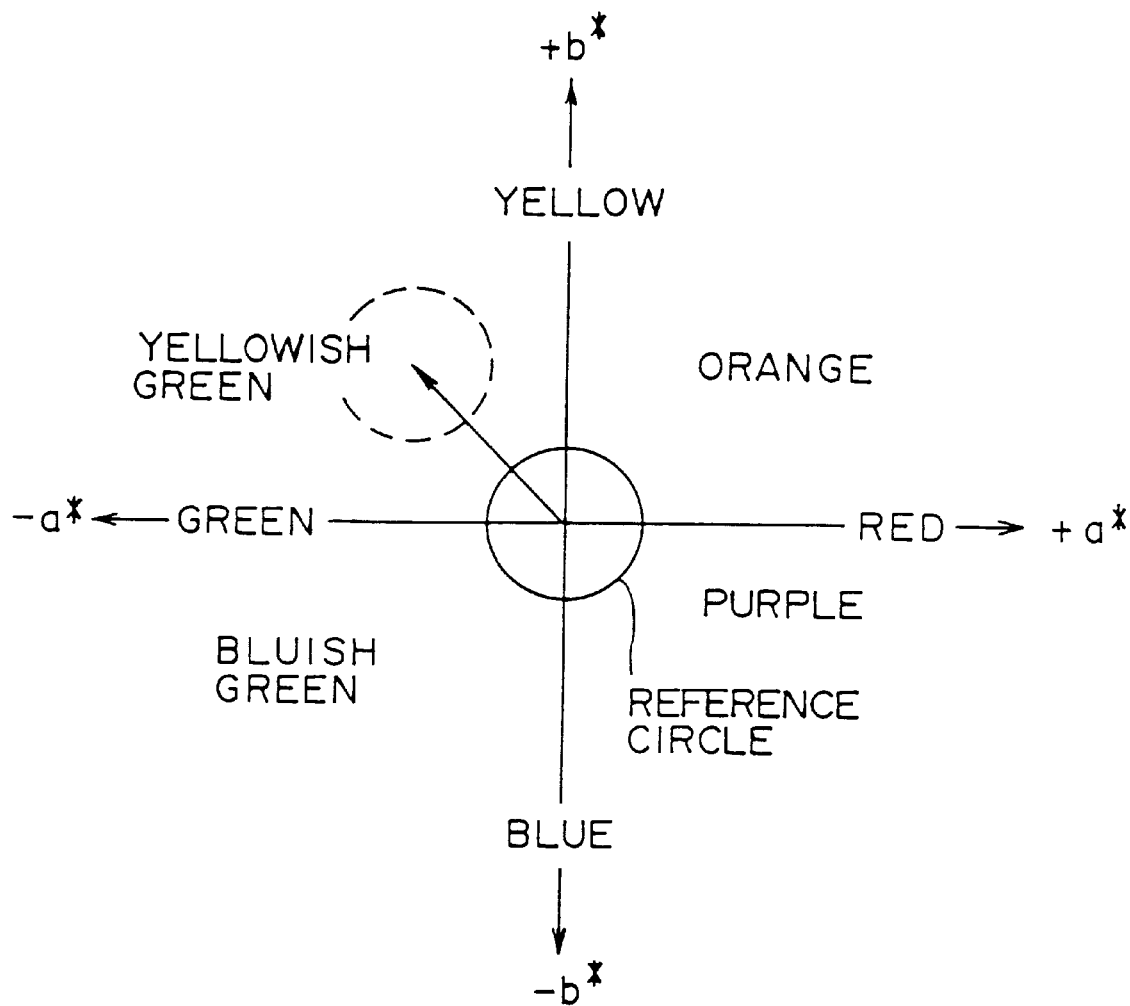
FIG. 9 is a diagram showing a hue correction method.
Figure 10:
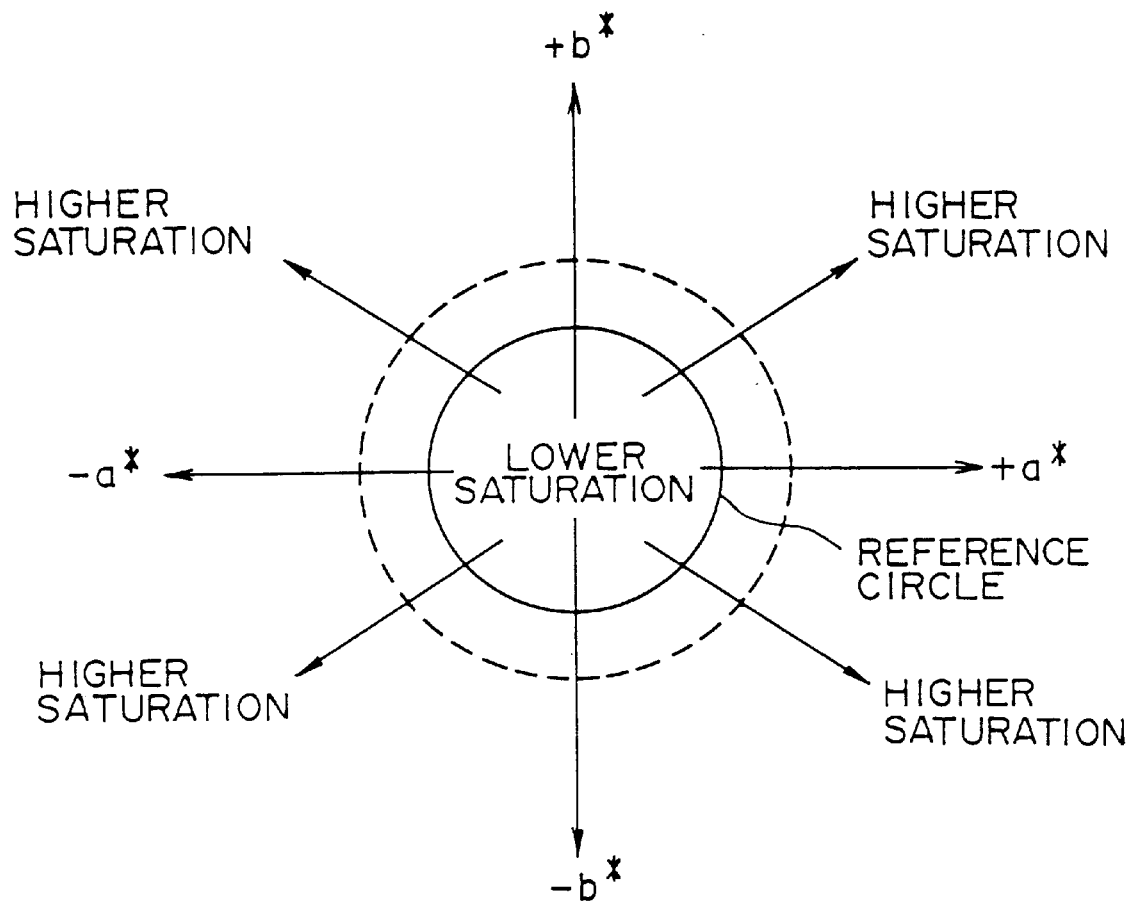
FIG. 10 is a diagram showing a saturation correction method.

In the a* b* plane of FIG. 9, the positive a* axis represents a red hue. Hues of purple, blue, greenish blue, green, yellowish green, yellow, and orange are arranged clockwise from the red hue. The hues can be wholly changed by displaying a reference circle with its center at the origin of the a*b* plane and allowing the user to move that circle. For example, if the circle is moved from the origin to the upper left, then the result will contain more yellowish green. As shown in FIG. 10, the farther away it is from the origin of the same a*b* plane, the higher the saturation becomes. In other words, the closer it is to the origin, the lower the saturation becomes. Thus, the saturation can be enhanced by enlarging the circle or lowered by reducing the circle.

Next, the processing by the image processing system of FIG. 4 will be described with reference to FIGS. 11 and 12.

Figure 11:
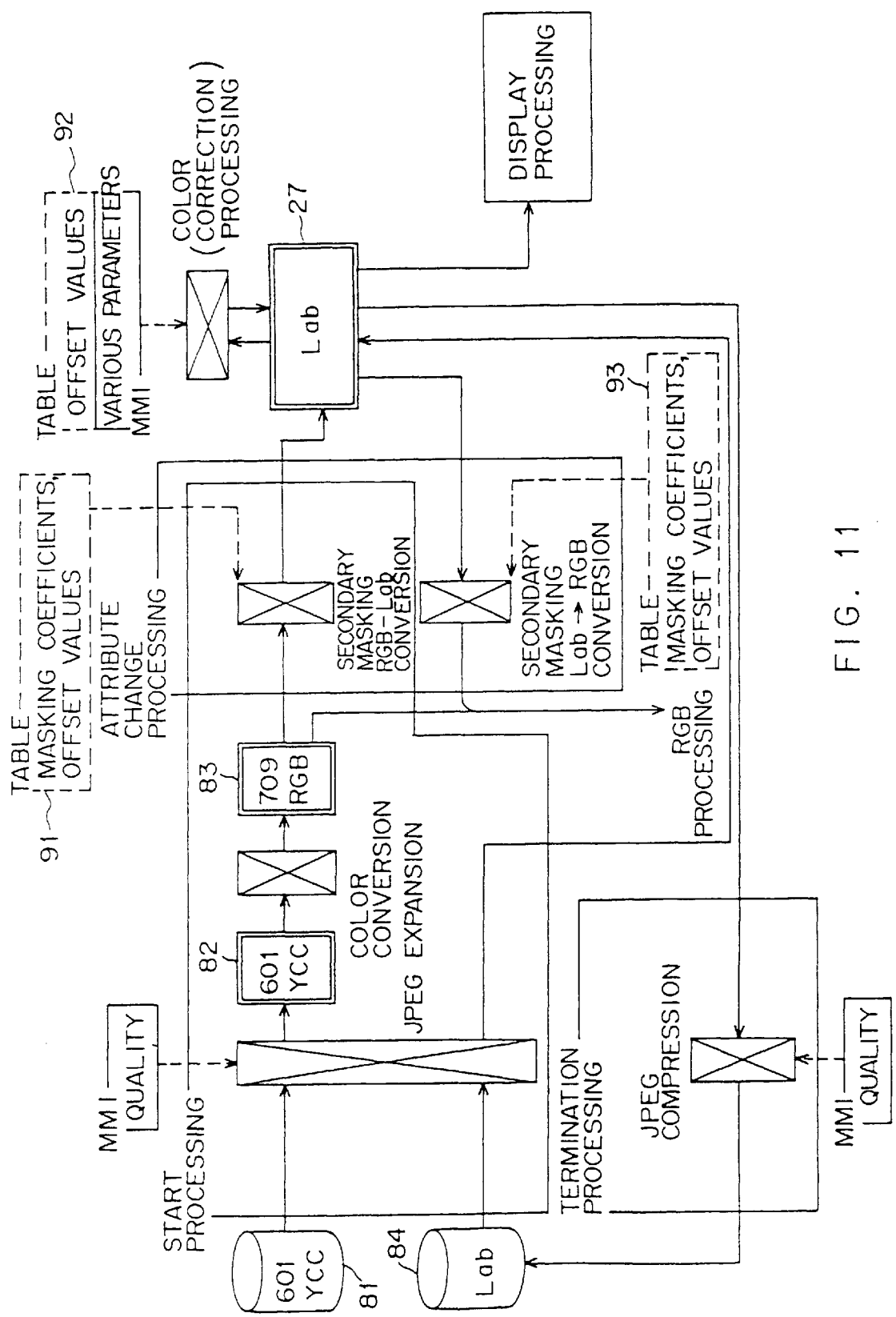
FIG. 11 is a diagram showing a scheme of processing within the system.

FIG. 11 shows the flow of processing. At the start of processing, compressed image data 81 (601YCC) entered into the database input section 24 is JPEG expanded in the quality specified by the user through an MMI(man-machine interface) to provide image data 82. The image data 82 is then color-converted into image data 83 (709RGB linear). Here, 601YCC represents the characteristics of a television signal. The MMI includes an input device, such as a keyboard, a pointing device, or the like, which is attached to the image processing workstation 12. The image data 83 is converted from the RGB color space to the Lab color space by the secondary masking of an attribute changing process to produce image data 27 (Lab). At this point, masking coefficients or offset values stored in a table 91 are used.

The image data 27 is displayed on the screen of the display 11 on the basis of the display processing and corrected using various parameters for the Lab color space that are specified by the user in the color information correction processing. On the screen of the display a parameter specification window is displayed, which allows the user to change parameters with easy operations while watching color space information within that window. The offset values stored in the table 92 are used to correct the image data 27 according to the specified parameters. At the termination of the processing, the image data 27 is JPEG compressed in the quality specified by the user and then output as image data 84 (Lab) to the database server 16. Reentered into the database input section 24, the image data 84 is JPEG expanded to the image data 27 again.

It is also possible to retouch the image data 83 by the RGB processing without conversion to the Lab color space. In the RGB processing, like the prior art, numeric values are specified to correct data. If the image data 27 is converted from the Lab color space to the RGB color space by the secondary masking of the attribute change processing, the conventional RGB processing can be used. For the secondary masking, masking coefficients or offset values stored in the table 93 are used.

Figure 12:
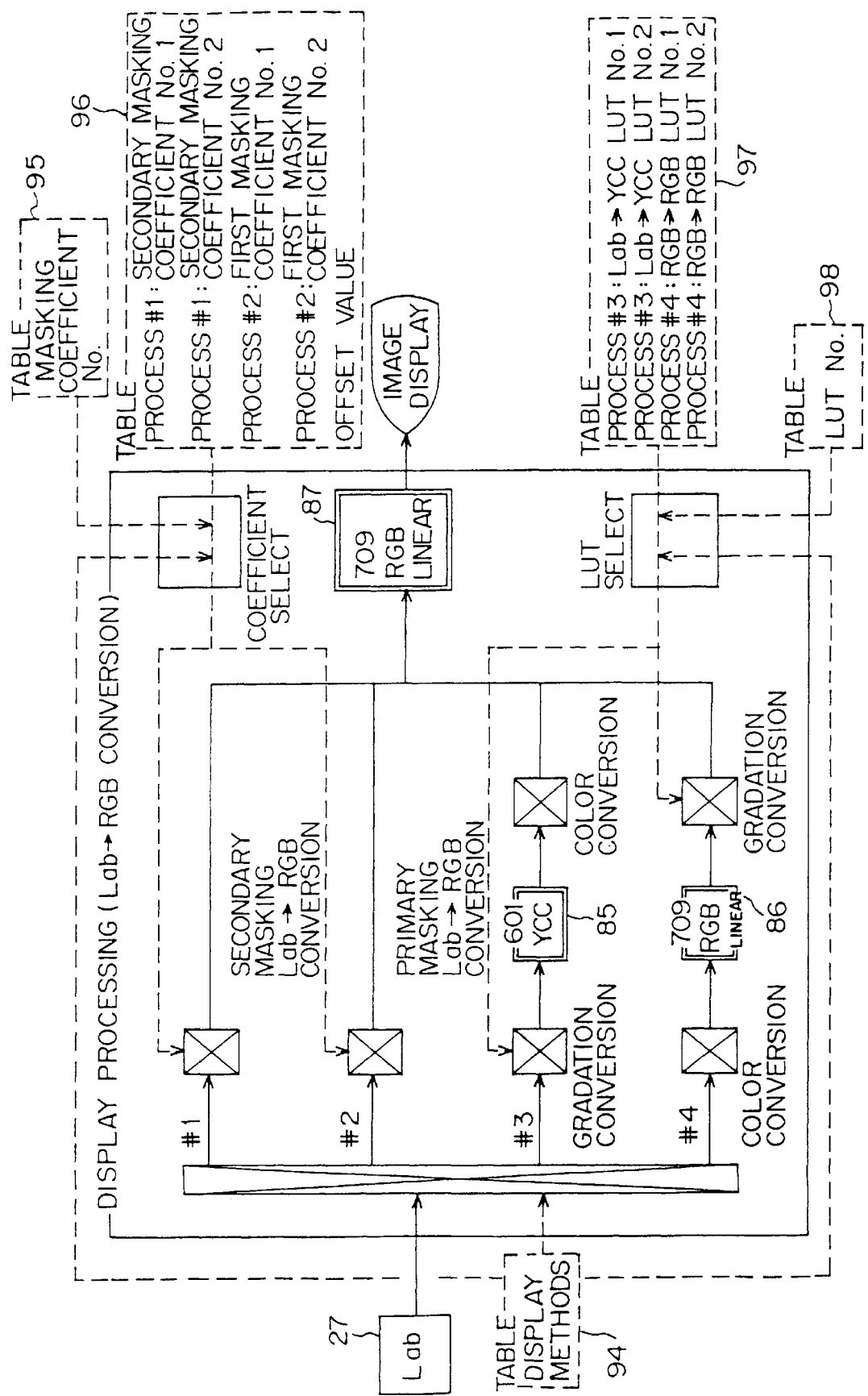
FIG. 12 is a diagram showing a scheme of display processing.

FIG. 12 shows the flow of display processing of the image data 27. In this display processing, the display processor 28 performs one of processes #1, #2, #3 and #4 according to display methods set up in a table 94.

In the case of the process #1, the image data 27 is converted from the Lab color space to the RGB color space by the secondary masking and then displayed as image data 87 (709RGB linear). In the case of the process #2, the image data 27 is converted from the Lab color space to the RGB color space by the primary masking and then displayed as image data 87 (709RGB linear). The secondary masking coefficients, the primary masking coefficients and the offset values which are used in these conversion processes are stored in a table 96. Specific masking coefficient numbers are placed in a table 95. In the process #1 or #2, masking coefficients are selectively read from the table 96 on the basis of the contents of the tables 94 and 95.

In the case of the process #3, the image data 27 is first subjected to gradation conversion to image data 85 (601YCC) and the image data 85 is then subjected to color conversion to the image data 87 and then displayed. In the case of the process #4, the image data 27 is first subjected to color conversion to image data 86 (709RGB linear) and the image data 86 is then subjected to gradation conversion to the image data 87 and then displayed. Lookup tables (LUTs) used in these gradation conversion processes are stored in a table 97. Specific LUT numbers are placed in a table 98. In the process #3 or #4, an LUT is selectively read from the table 97 on the basis of the contents of the tables 94 and 98.

The tables 91, 92, 93, 94, 95, 96, 97, and 98 in FIG. 11 and FIG. 12 are set up in an memory in the image processing work station 12.

In the present embodiment, the ranges of values for L*, a*, and b* in the image data 27 are defined as follows:

$$0.0 \leq L^* \leq 100.0$$
$$-128.0 \leq a^* \leq 127.0 \quad (1)$$
$$-128.0 \leq b^* \leq 127.0$$

These data will be called external data.

In expression (1), the upper limit value $a_{MAX}$ of a* and the upper limit value $b_{MAX}$ of b* are both 127. The lower limit value $a_{MIN}$ of a* and the lower limit value $b_{min}$ of b* are both −128. These upper and lower limit values, which are changeable, have been previously entered into the table 92 of FIG. 11.

Figures 14, 18:
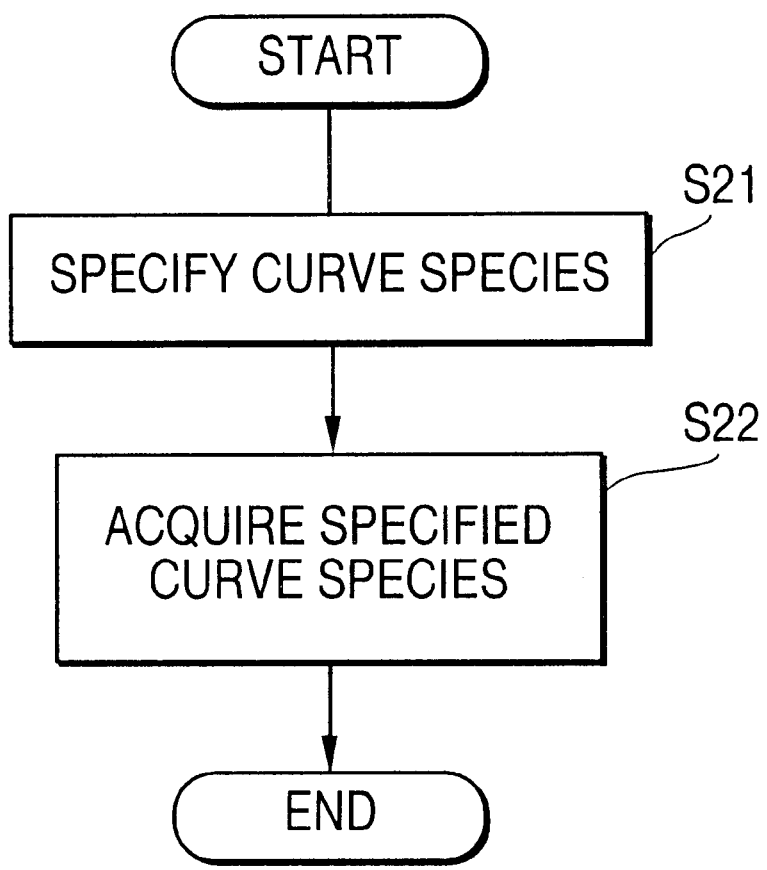
FIG. 14 is a diagram showing an example of a color information correction table.
FIG. 18 is an operating flowchart for the setup of a L* value correction curve species.

Within the system, the external data L*, a* and b* are represented by internal data $L_{LV}$, $a_{LV}$, and $b_{LV}$, respectively, each of which is eight bits in length and hence represents 0 to 255. Each piece of the internal data is also called a level value. In FIG. 13, there are shown equations for conversion between corresponding external and internal data and numerical ranges of corresponding external and internal data. In FIG. 13, (int) and (float) represent conversion to data formats of the following types: integer, and floating-point. In addition, $a_{OF}$ and $b_{OF}$ are offset values entered into the table 92 and represent $a_{LV}$ and $b_{LV}$ values corresponding to a*=0 and b*=0, respectively. In the present embodiment, $a_{OF}$=$b_{OF}$=128. These values are also changeable. An example of the table 92 in the present embodiment is shown in FIG. 14.

In color information correction processing, reference is made to each parameter value in the table 92.

Figure 15:
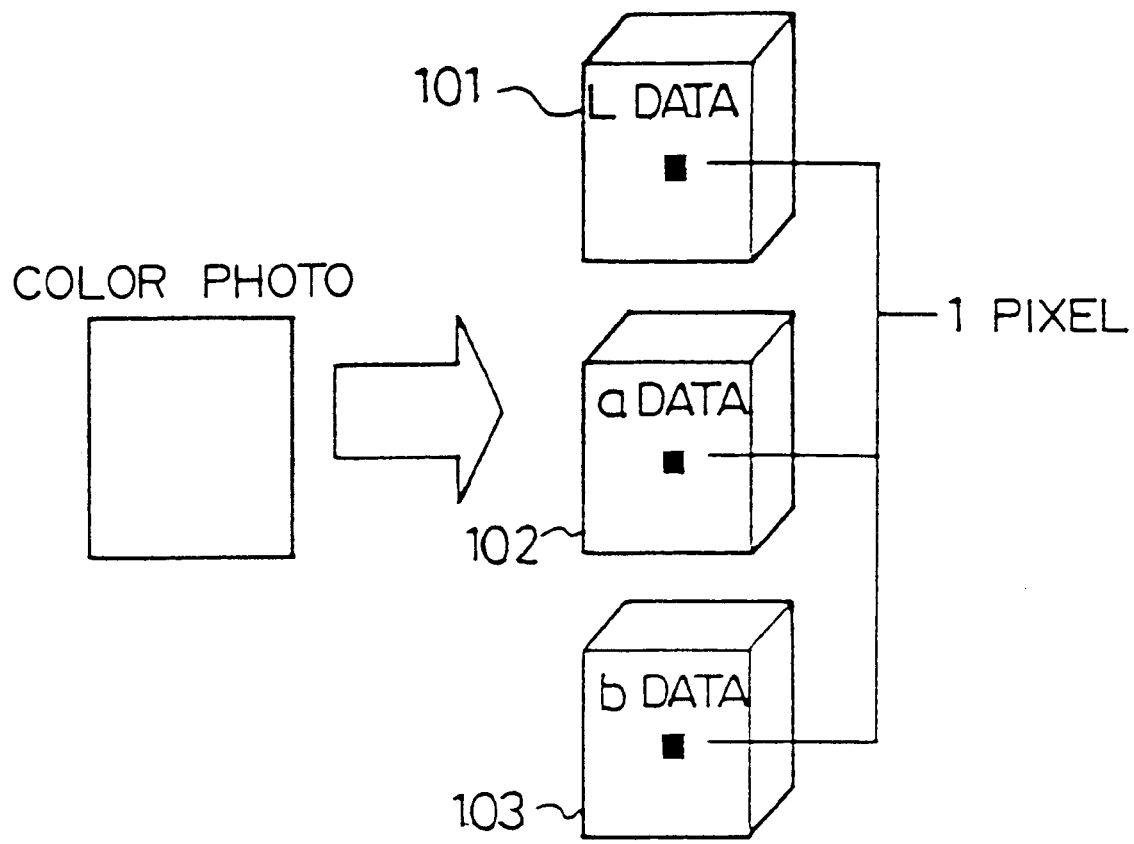
FIG. 15 is a diagram showing image data using the Lab color space.

FIG. 15 shows an example of image data 27 in FIG. 11. Image data of a color photo of FIG. 15 consists of L data 101, a data 102, and b data 103. The color of each pixel is represented by specifying pixel values for L*, a* and b*. Note that the L data 101, a data 102 and b data 103 are managed by using the internal data $L_{LV}$, $a_{LV}$, and $b_{LV}$. At the time of the correcting of hue or saturation, such a process as shown in FIG. 16 is performed. In FIG. 16, of image data of a slightly fogged color photo, L data 101 is copied as it is and a data 102 and b data 103 are changed according to conversion curves 104 and 105, respectively, thus producing a color photo with no fog or with enhanced saturation.

To correct fogging, the user provides an instruction to move the reference circle 106 in the a*b* plane displayed within the window on the screen of the display 11 in the direction opposite to that of the fogged color. By way of example, to remove yellowish-green fog, the user simply moves the reference circle 106 in the direction of purple. To correct saturation, the user provides an instruction to change the size of the reference circle. For example, in order to enhance the saturation of the entire image, the user simply enlarges the reference circle. The gradation converter 33 in the retouch processing section 32 automatically calculates the conversion curves 104 and 105 on the basis of the position and size of the reference circle thus changed and then corrects the a* data 102 and the b* data 103 using the resulting conversion curves.

Figure 17:
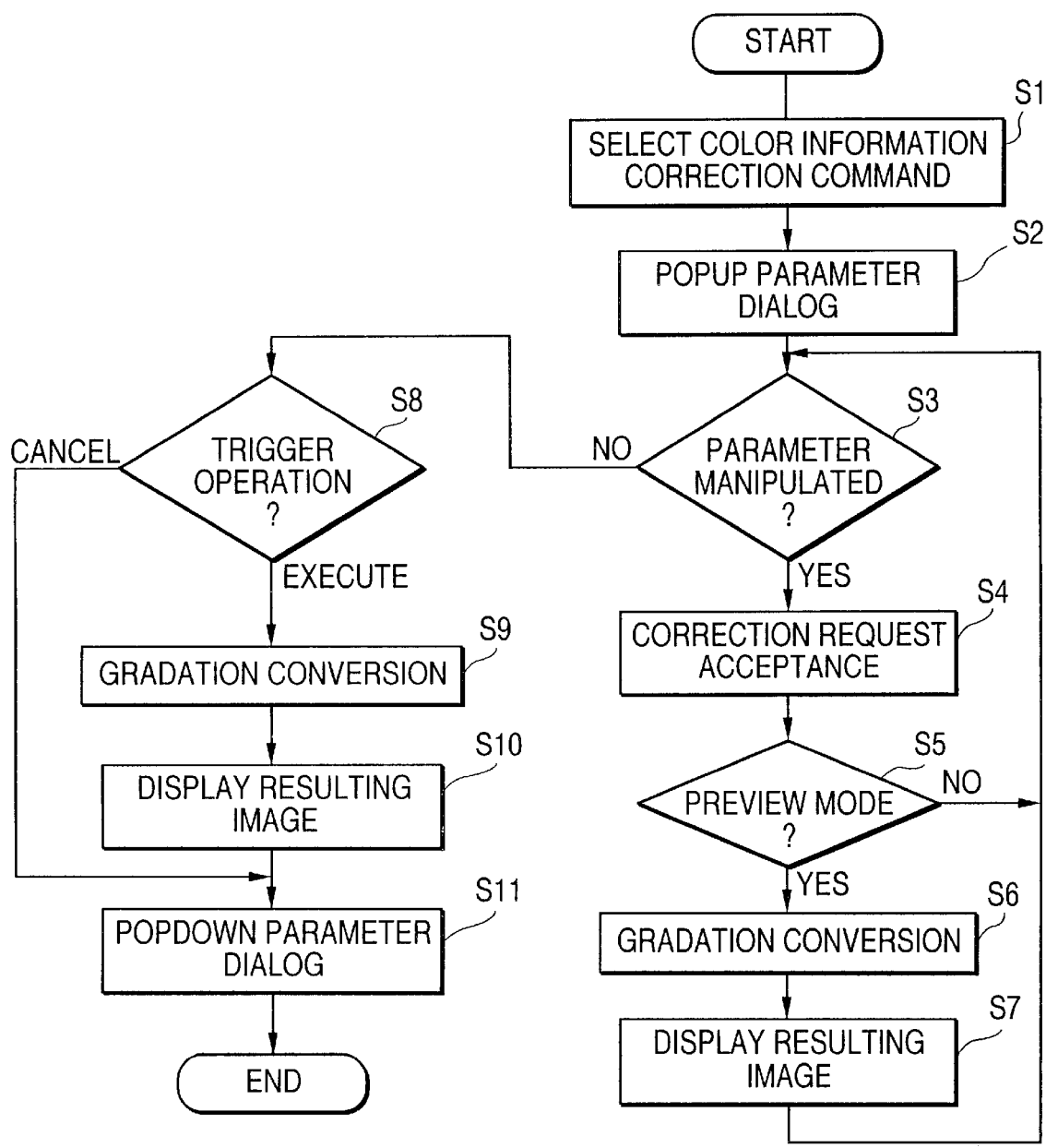
FIG. 17 is an operating flowchart for color information correction processing.

Next, the flow of color information correction processing and an operating display screen will be described with reference to FIGS. 17 through 34. FIG. 17 is an operating flowchart for the color information correction processing for the image data 27. FIGS. 18, 19, 20, 21, 22, 23, and 24 are each an operating flowchart for the correction accept processing in step S4 of FIG. 17.

At the start of processing, a color information correct command is selected by the user (step S1). As a result, a parameter dialog box pops up under the control of the dialog controller 31 (step S2) and the user is then inquired as to whether he or she manipulates the parameters (L*, a*, b*) of Lab color space image data (step S3). When the user selects the parameter manipulation, an operating window is displayed at the side of an on-screen image and the gradation converter 33 performs a color information correction accept process (step S4).

Figure 25:
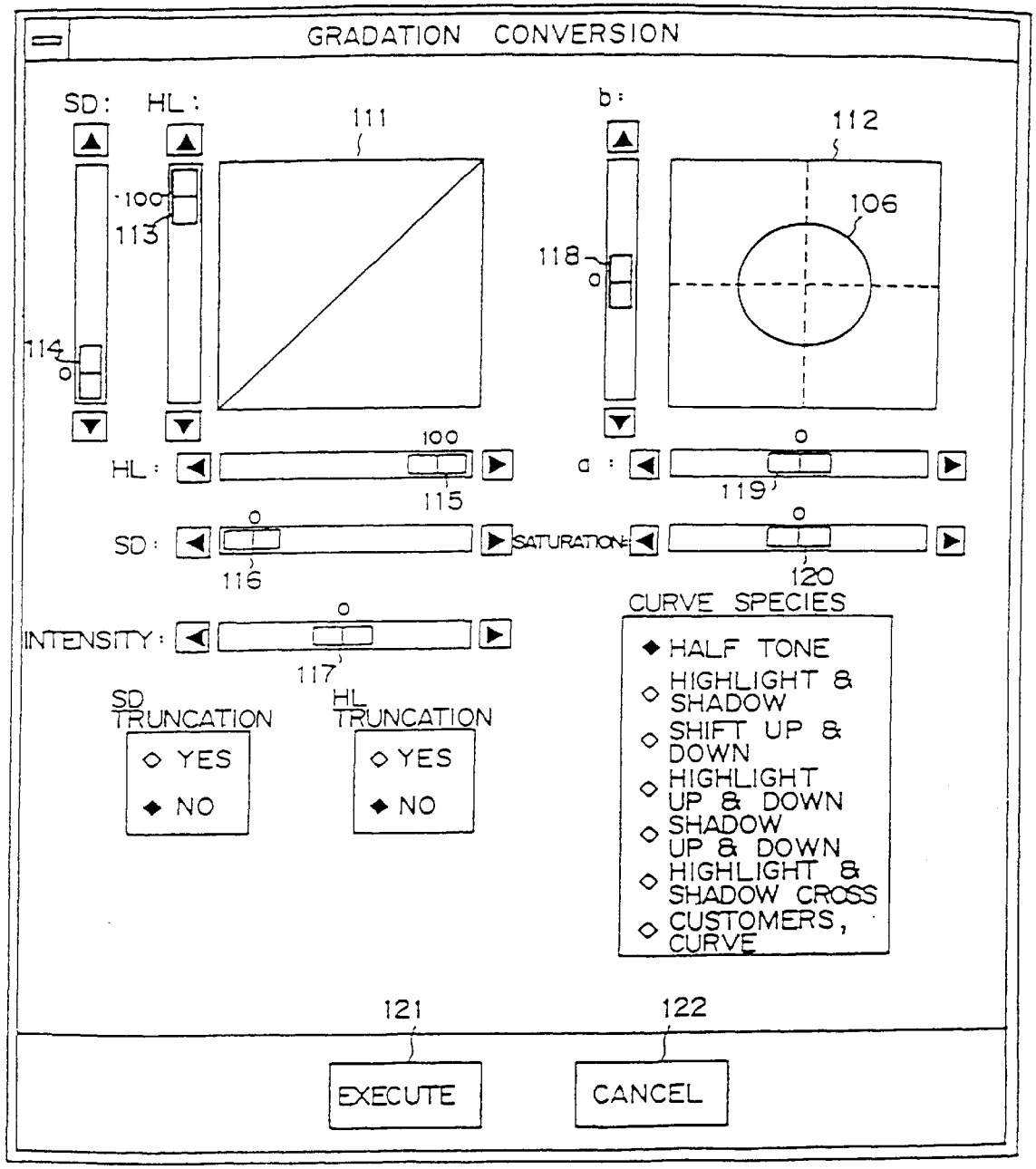
FIG. 25 is a diagram showing an example of an operating window.

FIG. 25 shows an example of an operating window. In a window 111 within the operating window of FIG. 25, a gradation conversion curve for lightness information L* is displayed graphically. In a window 112, the a*b* plane and a reference circle 106 representing color tone information are displayed graphically. The gradation curve in the window 111 is used in making corrections on lightness information. The color tone graph in the window 112 is used in making corrections on hue/saturation information.

Next, the dialog controller 31 makes a decision of whether the operation is in the preview mode (S5). In the preview mode, the gradation converter 33 carries out a gradation conversion process in accordance with the conditions set up by the process of accepting the correction request (S6). The display processing section 28 displays an image resulting from that process (S7). The procedure then returns to the process in step S3. If the decision in step S5 is that the operation is not in the preview mode, then the procedure returns to step S3.

If, in step S3, the user does not select the parameter manipulation, then the dialog controller 31 inquires of the user as to whether he or she executes a trigger operation (step S8). When the user selects the execution of the trigger operation, the gradation converter 33 performs a gradation conversion process under the conditions set up last time (S9) and the display processing section 28 displays the results of that process on the display screen (S10). The parameter dialog pops down under the control of the dialog controller 31 (S11) and the procedure comes to an end.

In the correction request accept process in step S4, one of processes shown in FIGS. 18 through 24 is performed, depending on what operation the user selects on the operating screen shown in FIG. 25. A pointing device, such as a mouse, is mainly used for pointing on the screen.

FIG. 18 is an operating flowchart for the determination of a species of gradation conversion curve used for correcting a L* value in the correction request accept process in step S4 in FIG. 17. When the user specifies parameters for a species of curve (S21), the gradation converter 33 acquires and stores the selected curve (S22), so that the procedure comes to an end.

Routine curves for gradation conversion include curves shown in FIGS. 26 and 27. With gradation conversion based on these curves, a L* value entered before correction is converted to the corresponding L* value on a curve.

Figure 26C:
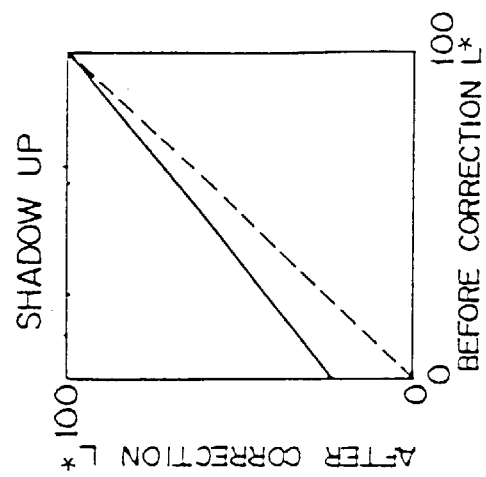
FIGS. 26A to 26F is a diagram showing L* value correction curves.
Figure 26F:
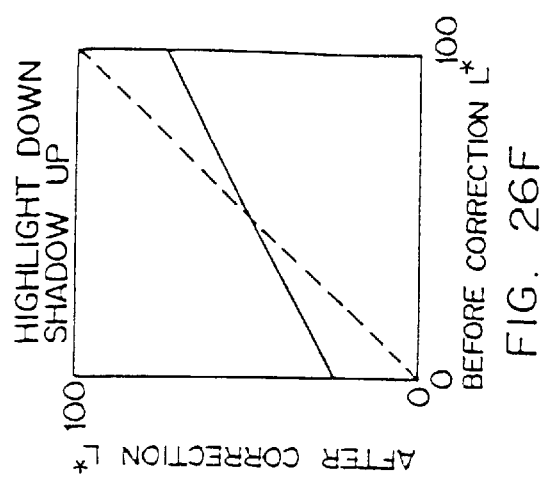
Figure 26B:
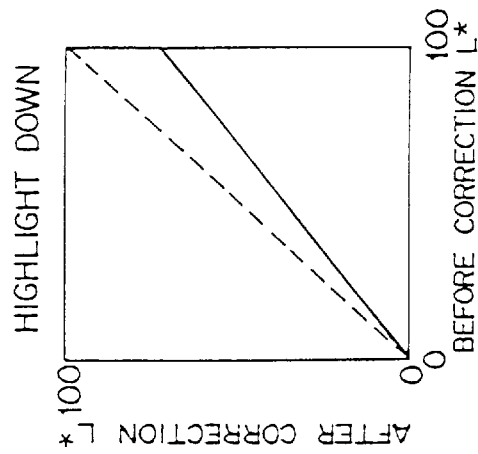
Figure 26E:
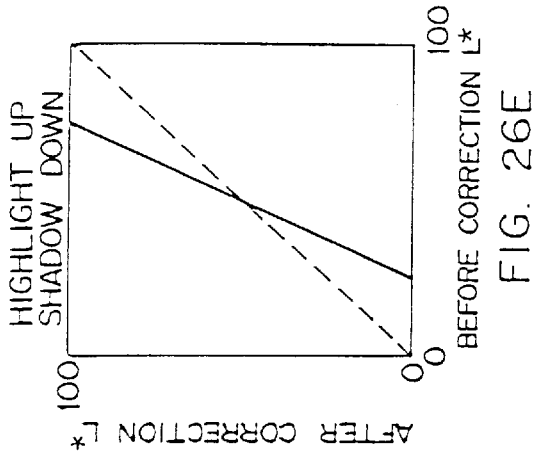
Figure 26A:
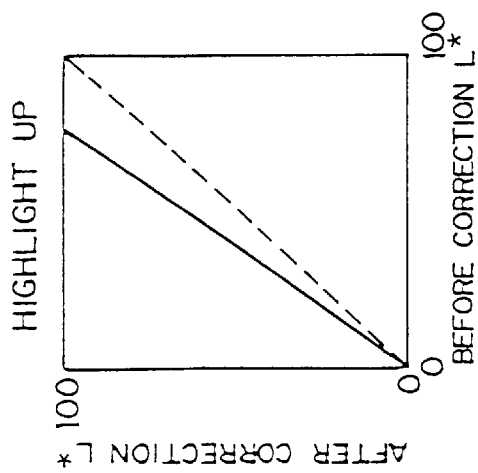

When the user desires to use highlight-up in FIG. 26A or highlight-down in FIG. 26B he or she selects "HIGHLIGHT UP & DOWN" from among curve species in the dialog box shown in FIG. 25. For shadow-up in FIG. 26C or shadow-down in FIG. 26D, the user selects "SHADOW UP & DOWN". For highlight-up shadow-down in FIG. 26E or highlight-down shadow-up in FIG. 26F, "HIGHLIGHT & SHADOW CROSS" is selected. For shift-up in FIG. 27A or shift-down in FIG. 27B, "SHIFT UP & DOWN" is selected. For middle-up in FIG. 27C or middle-down in FIG. 27D, "HALF TONE" is selected. For a contrasty tone in FIG. 27E or a soft tone in FIG. 27F, "HIGHLIGHT & SHADOW" is selected. For a conversion curve that is not included in those routine curves, "CUSTOMIZE CURVE" is selected.

FIG. 28 shows an example of a selection from among the curve species. Here, "HALF TONE" is selected and the corresponding conversion curve is displayed in the window 111.

Figure 19:
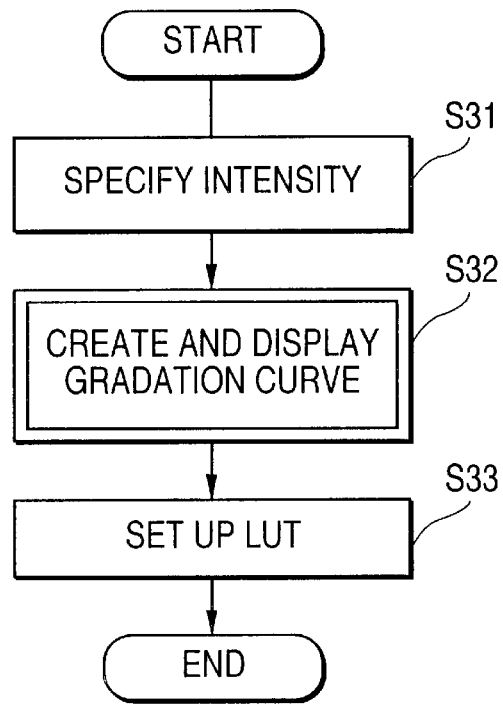
FIG. 19 is an operating flowchart for the setting of intensity.

FIG. 19 is an operating flowchart for setting of the intensity of conversion by a gradation conversion curve in the process of accepting the correction request in step S4 of FIG. 17. When the user operates an operating lever 117 shown in FIG. 25 to specify an intensity parameter (S31), the gradation conversion section 33 creates and displays a gradation conversion curve (gradation curve) corresponding to the specified intensity (S32). At this point, a variation of the curve is changed according to the specified intensity. A L* data conversion table (LUT) corresponding to the curve is set up (S33) and the procedure comes to an end.

Figure 29:
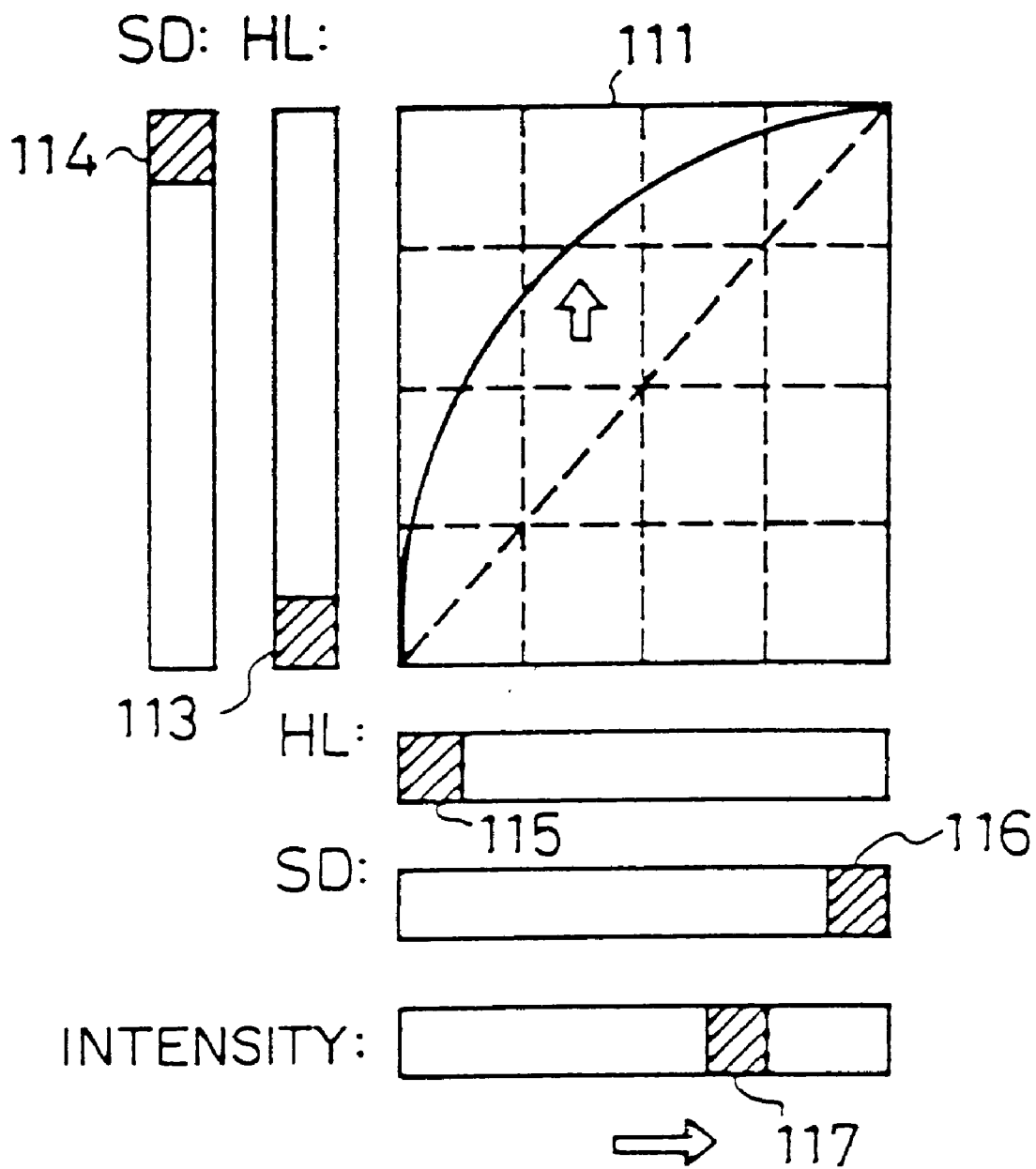
FIG. 29 is a diagram showing a first example of a process of specifying intensity.
Figure 30:
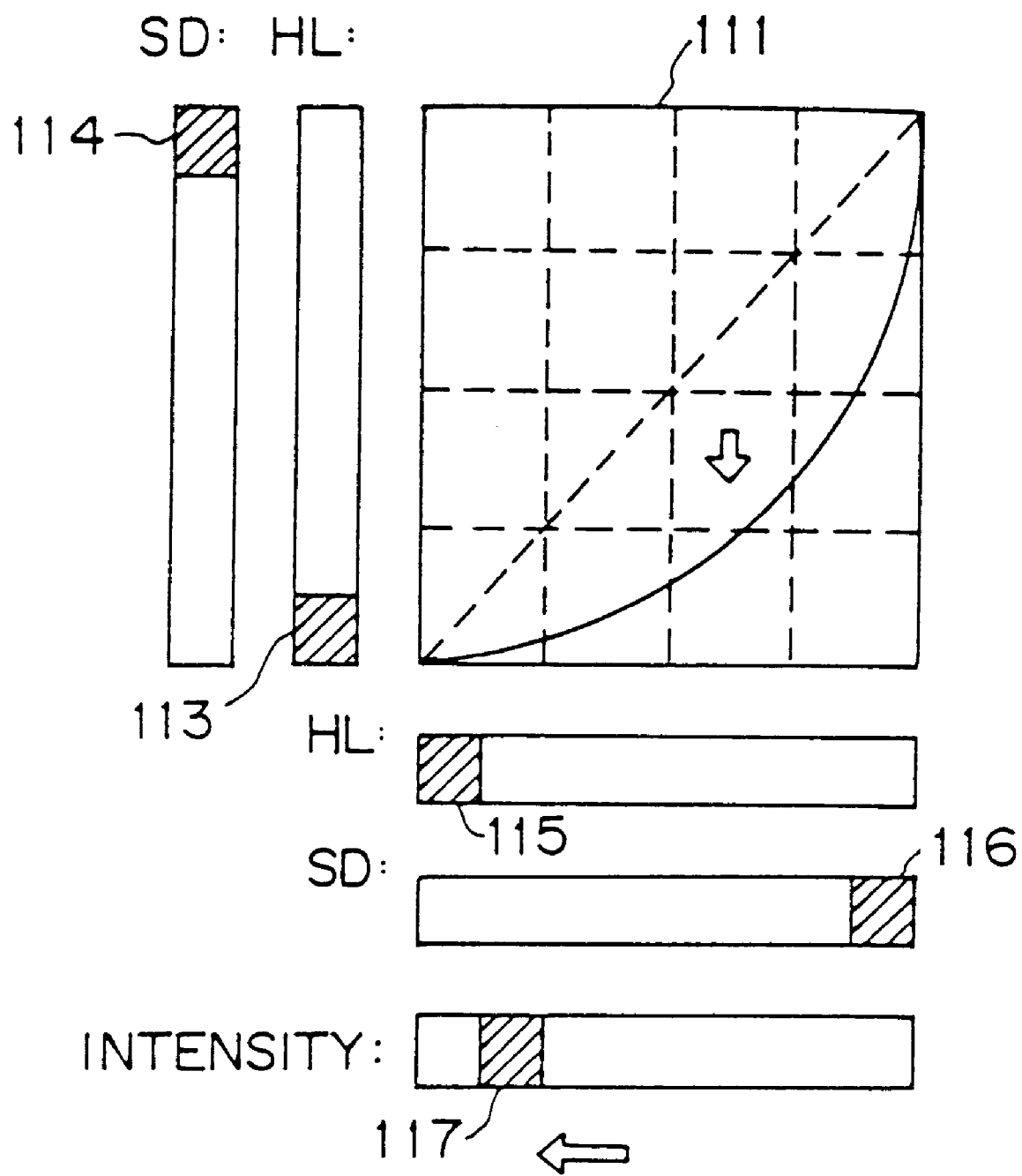
FIG. 30 is a diagram showing a second example of a process of specifying intensity.

FIGS. 29 and 30 show examples of conversion curves the specified conversion intensity of which differs from each other. In the case of FIG. 29, the operating lever 117 is shifted in the positive direction, so that the half tone curve swells upward to form a curve of the middle up type shown in FIG. 27C. In the case of FIG. 30, on the other hand, the lever is shifted in the negative direction, so that the half tone curve swells downward to form a curve of the middle down type shown in FIG. 27D. For any other routine curve as well, it is made available in two types by the same operation.

Figure 26D:
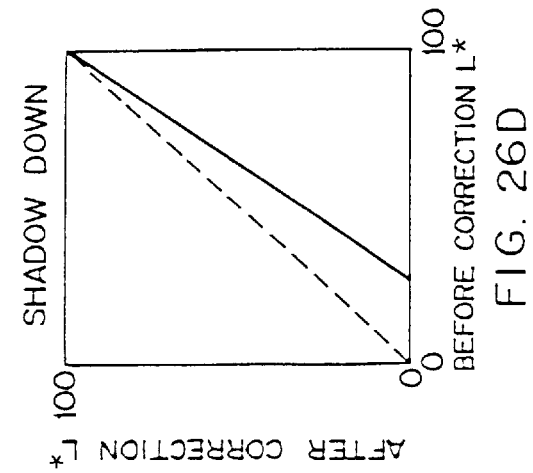

For example, when HIGHLIGHT UP & DOWN is selected, a curve of the highlight up type shown in FIG. 26A is obtained by shifting the lever 117 in the positive direction, or a curve of the highlight down type shown in FIG. 26B is obtained by shifting the lever in the negative direction. When SHADOW UP & DOWN is selected, a curve of the shadow up type shown in FIG. 26C is obtained by shifting the lever 117 in the positive direction, or a curve of the shadow down type shown in FIG. 26D is obtained by shifting the lever in the negative direction. When HIGHLIGHT & SHADOW CROSS is selected, a curve of the highlight up shadow down type shown in FIG. 26E is obtained by shifting the lever 117 in the positive direction, or a curve of the highlight down shadow up type shown in FIG. 26F is obtained by shifting the lever in the negative direction.

When SHIFT UP & DOWN is selected, a curve of the shift up type shown in FIG. 27A is obtained by shifting the lever 117 in the positive direction, or a curve of the shift down type shown in FIG. 27B is obtained by shifting the lever in the negative direction. When HIGHLIGHT & SHADOW is selected, a curve of the contrasty type shown in FIG. 27E is obtained by shifting the lever 117 in the positive direction, or a curve of the soft type shown in FIG. 27F is obtained by shifting the lever in the negative direction.

Figure 20:
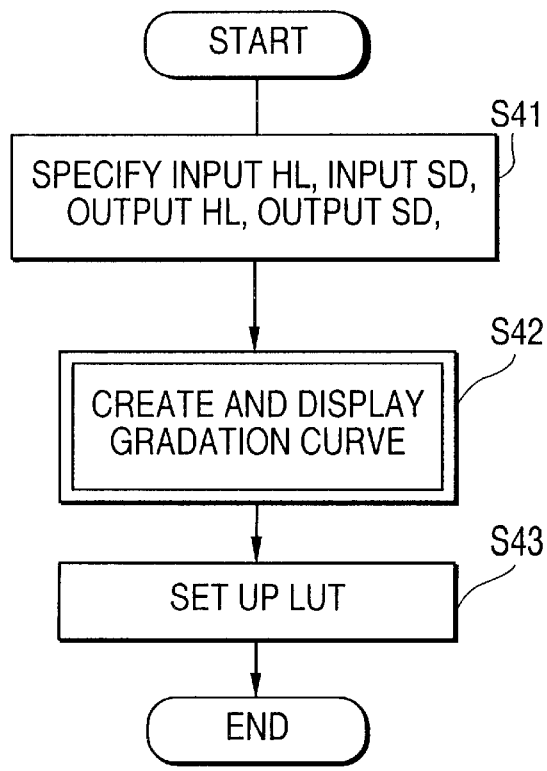
FIG. 20 is an operating flowchart for the setting of a range width.

FIG. 20 is an operating flowchart for the setting of the range width of a gradation conversion curve in the correction request accept process in step S4 of FIG. 17. When the user specifies parameters of input HL and SD and output HL and SD by operating levers 115, 116, 113, and 114 (S41), the gradation conversion section 33 creates and displays a gradation conversion curve as specified by the user (S42). The operating range of the levers 115, 116, 113 and 114 corresponds to the range [0, 100] of the external data L* and the range width of conversion is changed according to the specified parameters. An LUT for L* data corresponding to the curve is set up (S43) and the procedure comes to an end.

Figure 31:
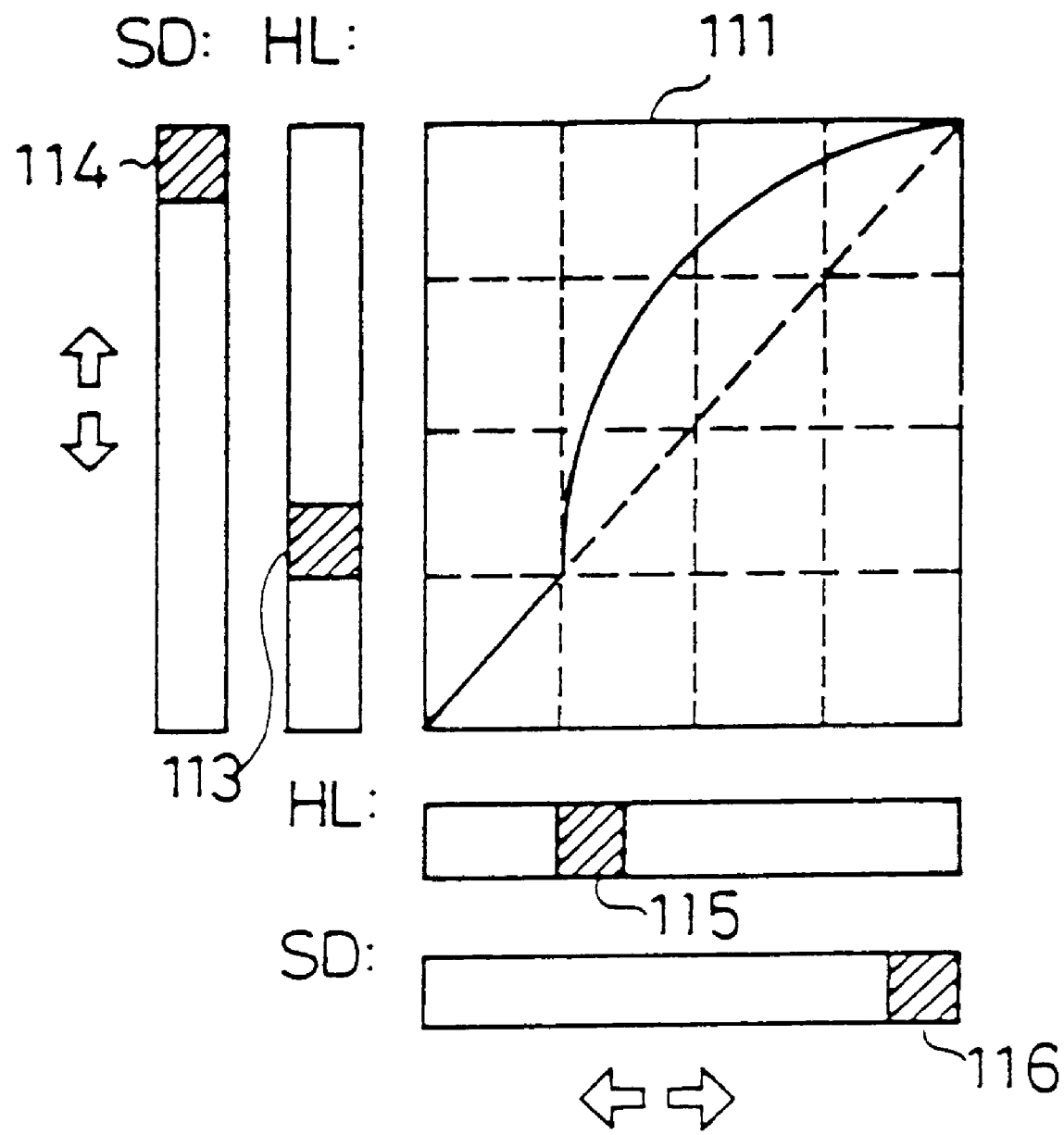
FIG. 31 is a diagram showing an example of a process of specifying a range width.

FIG. 31 shows an example of a setting of the range width of conversion. In the case of FIG. 31, each of the levers 115 and 113 is shifted by an amount, so that the positions of the input HL and the output HL are changed. In this case, the positions of the input HL and the output HL, i.e., the positions of the levers 115 and 113, represent the lower limit of a range over which a selected curve is applied. The positions of the input SD and the output SD represent the upper limit of that range. Thus, with changing positions of the input HL and the output HL, the range over which the half tone curve is applied in the window 111 changes.

Figure 21:
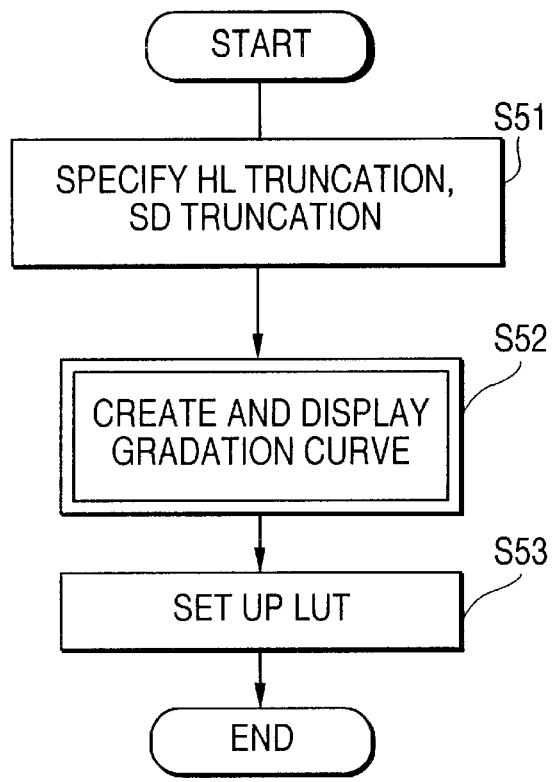
FIG. 21 is an operating flowchart for the truncation processing.

FIG. 21 is an operating flowchart for the determination of whether a gradation conversion curve is truncated in the correction request accept process in step S4 in FIG. 17. When the user specifies whether the HL or SD is to be truncated or not in a dialog box (S51), the gradation conversion section 33 creates and displays a gradation conversion curve as specified by the user (S52). When the HL or SD truncation is specified, a process of truncating the conversion curve is performed. In the HL truncation process, output values of L* in the range below the position specified by the input HL are set to the same value as the output value at that specified position. In the SD truncation process, on the other hand, output values of L* in the range above the position specified by the input SD are set to the same value as the output value corresponding to the input SD. Then, an LUT for L* data corresponding to the curve is set up (S53) and the procedure comes to an end.

Figure 32:
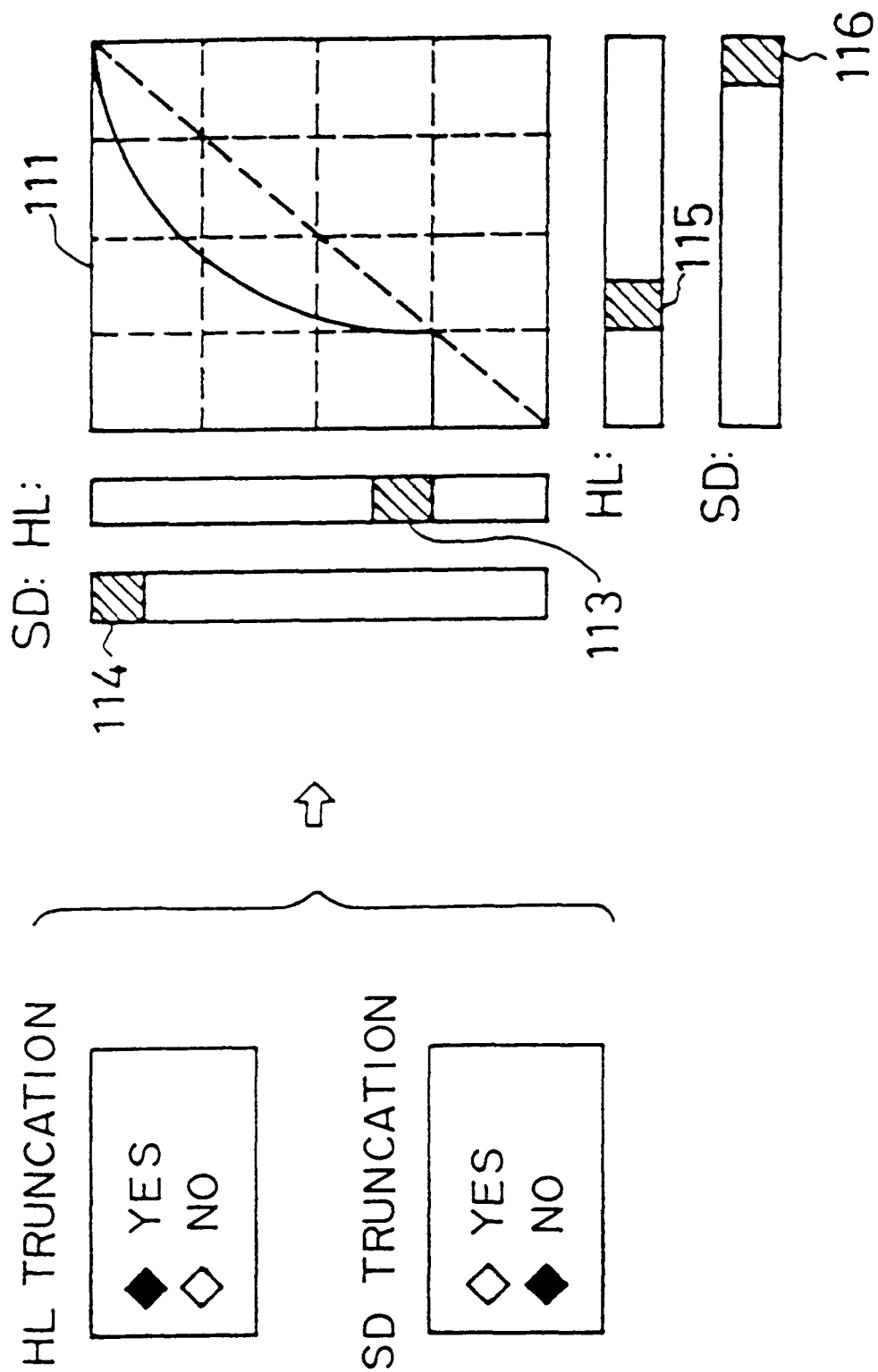
FIG. 32 is a diagram showing an example of a process of specifying truncation.

FIG. 32 shows an example of a truncation process. In this example, the HL truncation is specified but the SD truncation is not specified. Output values over the interval from 0 to input HL are set to the same value as the output value corresponding to the input HL. No SD truncation process is performed.

Figure 22:
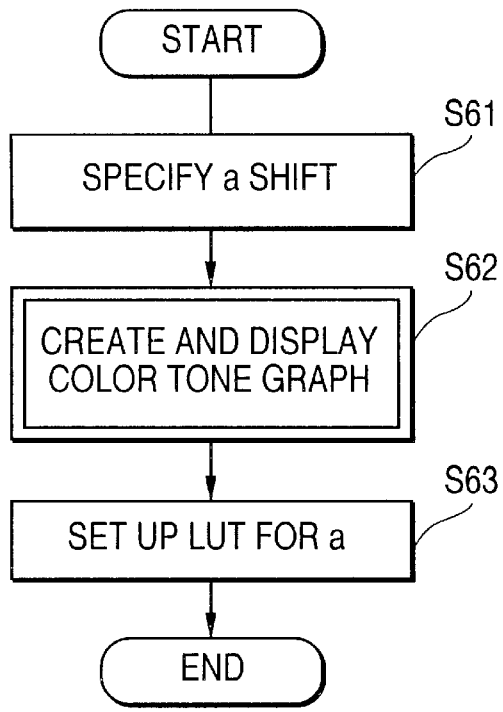
FIG. 22 is an operating flowchart for a* value correction processing.
Figure 23:
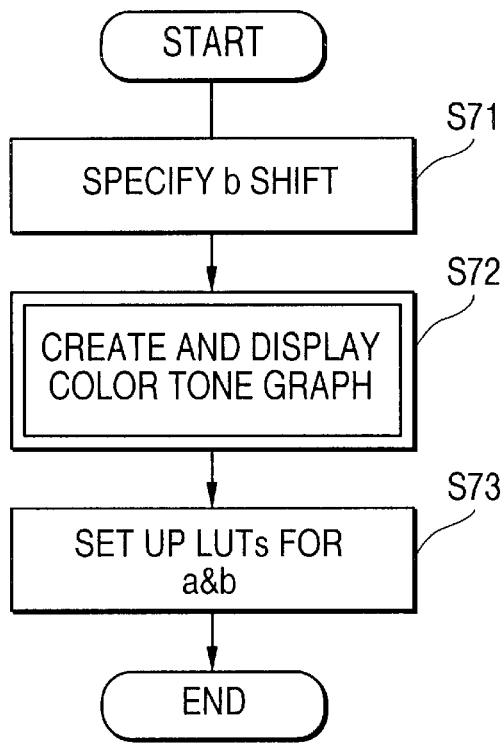
FIG. 23 is an operating flowchart for b* value correction processing.

FIGS. 22 and 23 are operating flowcharts for the process of correcting a* and b* values to change hue in the correction request accept process in step S4 in FIG. 17. In FIG. 22, when the user operates an operating lever 119 to specify an a* value (a shift) parameter (S61), the gradation conversion section 33 creates and displays a gradation conversion curve according to the specified parameter (S62). At this point, the reference circle 106 within the window 112 moves according to the specified parameter and the hue is changed accordingly. An LUT for a* values corresponding to the reference circle 106 is set up (S63) and the procedure comes to an end.

In FIG. 23, when the user operates an operating lever 118 to specify a b* value (b shift) parameter (S71), the gradation conversion section 33 creates and displays a gradation conversion curve according to the specified parameter (S72). At this point, the reference circle 106 within the window 112 moves according to the specified parameter and the hue changes accordingly. An LUT for b* values corresponding to the reference circle 106 is set up (S73) and the procedure comes to an end.

Figure 33:
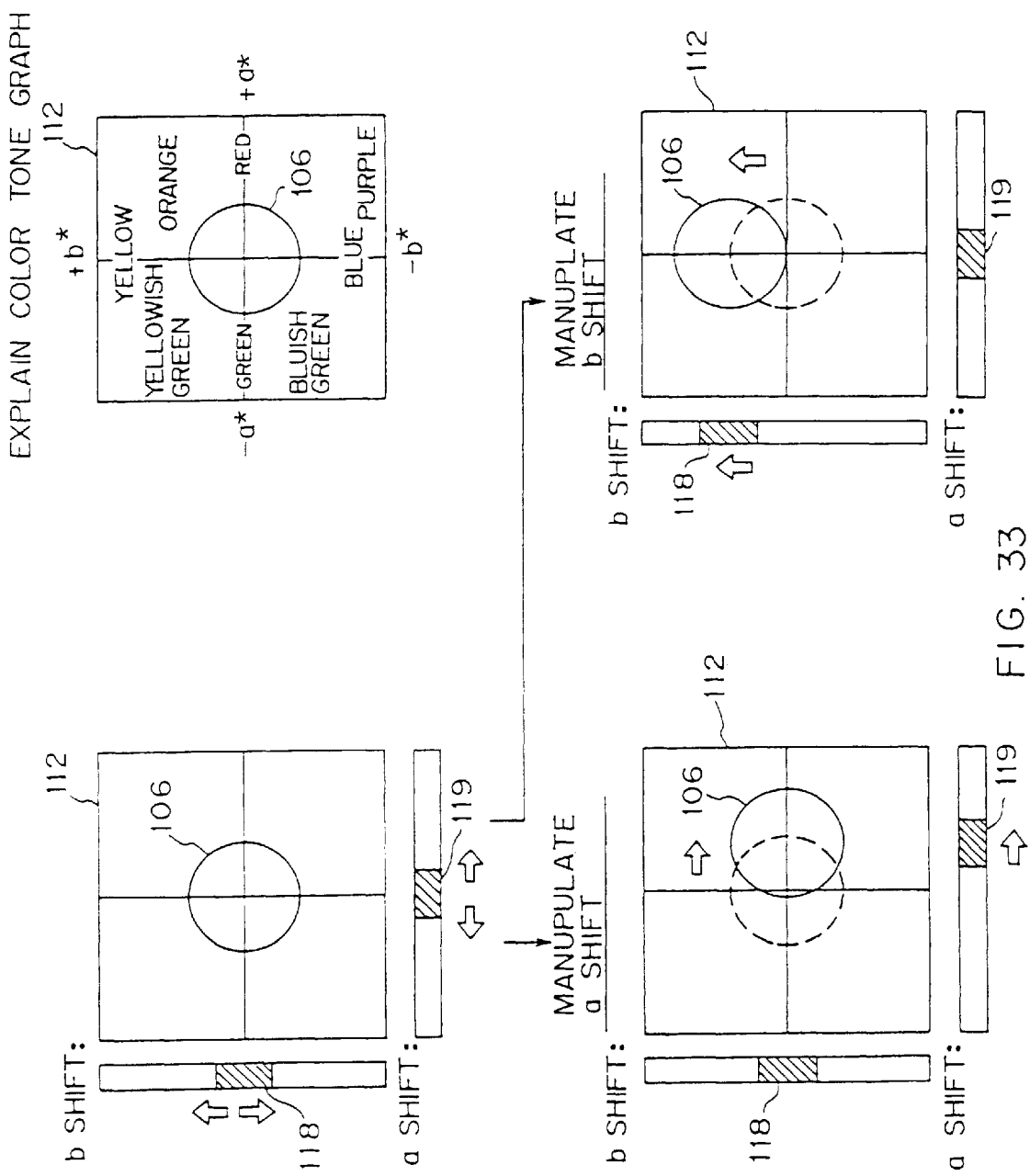
FIG. 33 is a diagram showing an example of a process of specifying a* and b* values.

FIG. 33 shows an example of an operation of specifying a* and b* values. When the lever 119 is shifted in the positive direction, the reference circle 106 moves in the direction of +a*, enhancing the red hue. When the lever 118 is shifted in the positive direction, on the other hand, the reference circle moves in the direction of +b*, enhancing the yellow hue. Conversely, to enhance the green hue, the lever 119 has only to be shifted in the negative direction. To enhance the blue hue, the lever 118 has only to be shifted in the negative direction.

Figure 24:
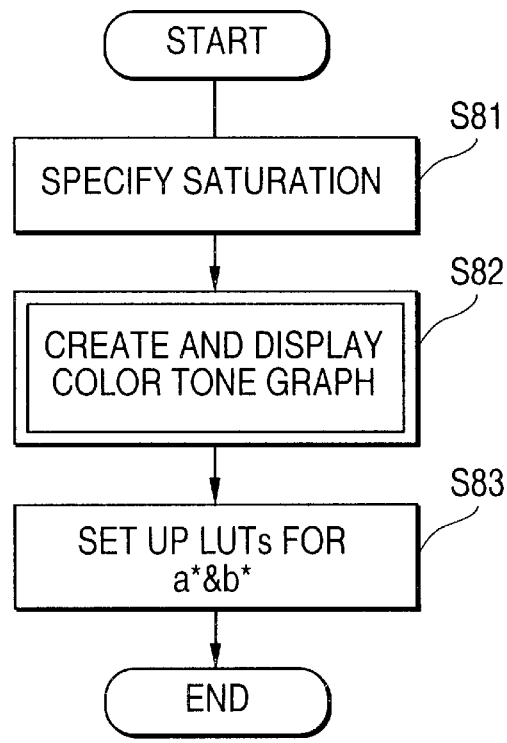
FIG. 24 is an operating flowchart for saturation correction processing.

FIG. 24 is an operating flowchart for correction of saturation in the correction request accept process in step S4 in FIG. 17. When the user operates an operating lever 120 shown in FIG. 25 to specify a saturation parameter (S81), the gradation conversion section 33 creates and displays a gradation conversion curve as specified by the user (S82). As a result, the size of the reference circle 106 changes according to the specified parameter and the saturation (vividness) changes accordingly. An LUT for a* and b* data corresponding to the reference circle 106 is set up (S83) and the procedure comes to an end.

Figure 34:
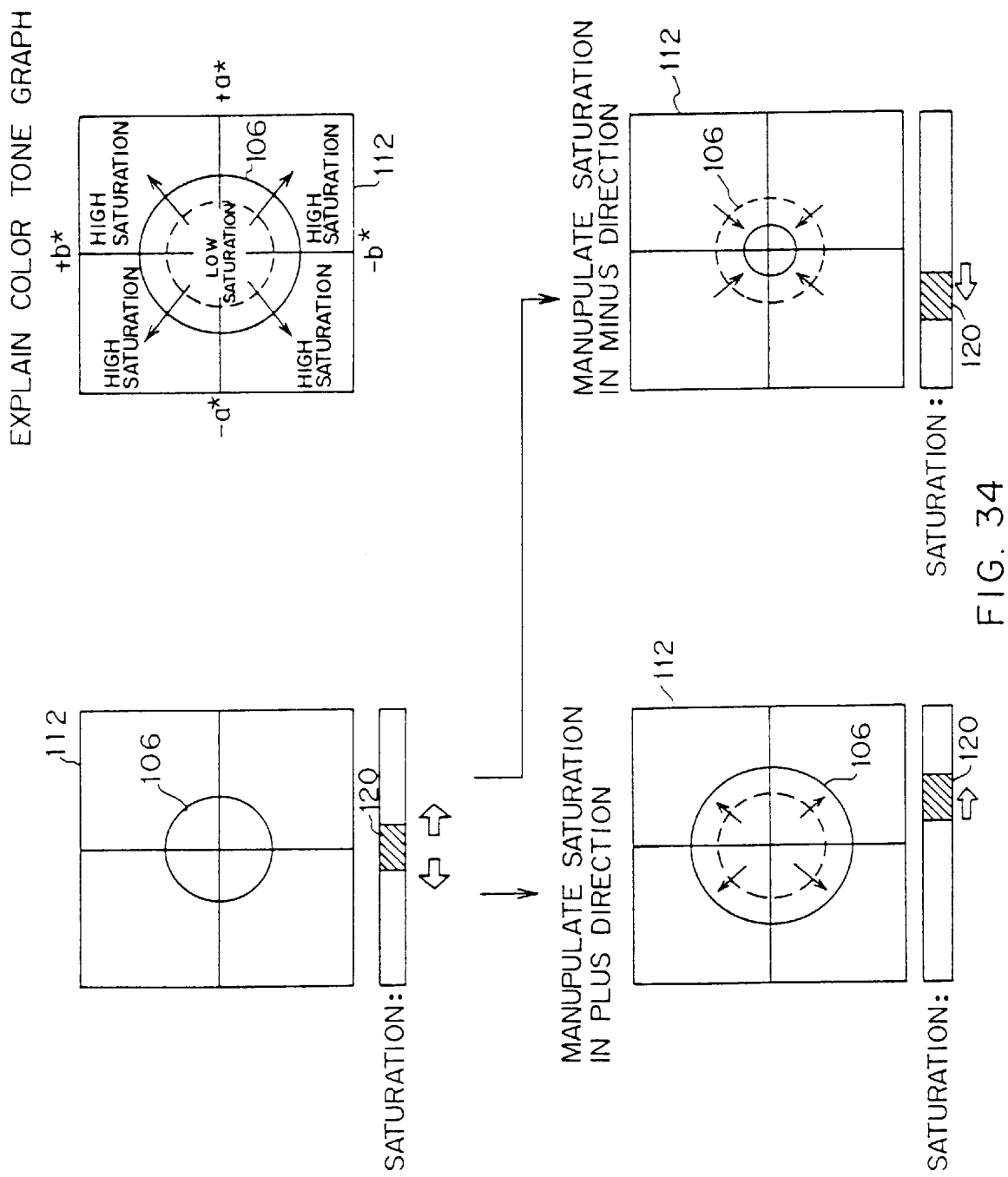
FIG. 34 is a diagram showing an example of a process of specifying saturation.

FIG. 34 shows an example of an operation of specifying saturation. When the lever 120 is shifted in the positive direction, the reference circle 106 becomes large, enhancing saturation. When the lever 120 is shifted in the negative direction, on the other hand, the reference circle 106 becomes small, lowering saturation.

Although, in the flowcharts of FIGS. 22, 23 and 24, the a* value, the b* value and the saturation are specified separately, they can also be specified successively on the same graph. For example, if the saturation is manipulated as shown in FIG. 34 after the a* value or the b* value has been manipulated to thereby move the reference circle as shown in FIG. 33, then the reference circle 106 will be enlarged or reduced in the position to which it has been moved. If, on the other hand, the a* value or b* value is manipulated after the saturation has been manipulated to thereby change the size of the reference circle, then it will move in the as-changed size. LUTs for a* and b* data are set up on the basis of the final position and size of the reference circle 106.

An execute button 121 and a cancel button 122 shown in FIG. 25 are used in determining whether to perform gradation conversion using an LUT set up in the above-described correction request accept process. To perform gradation conversion, the execute button is selected with a click of a mouse. To cancel an LUT set up with no gradation conversion, the cancel button 122 is selected with a click of the mouse.

Next, reference will be made to FIGS. 35 through 46 to describe gradation conversion processes using the LUTs set up in the correction request accept process. Each gradation conversion process is performed in step S6 or S9 in FIG. 17.

Figure 35:
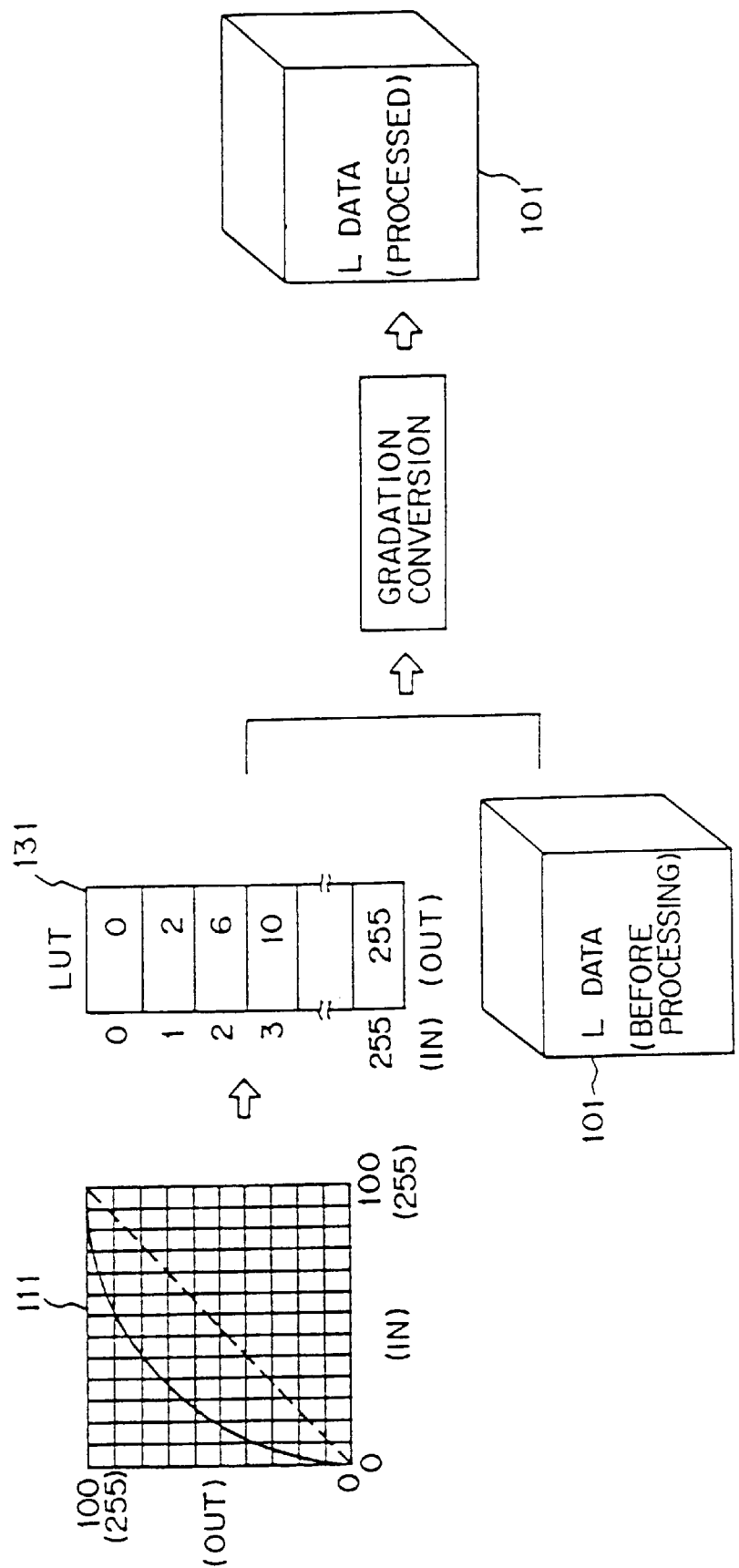
FIG. 35 is a diagram showing gradation conversion of an L* value.

FIG. 35 shows an example of a gradation conversion process for L* values. In this example, the half-tone curve is selected as a conversion curve and a gradation graph in which the intensity is manipulated in the positive direction, i.e., the middle-up conversion curve shown in FIG. 27(c), is illustrated. The input value (IN) and output value (OUT) of L* are both in the range [0, 100], which corresponds to the interval [0, 255] for internal data $L_{LV}$. On the basis of the gradation graph, an LUT 131 is created in terms of the internal data $L_{LV}$ (step S33). In the gradation conversion process, each pixel value (IN) in L data 101 is converted to the corresponding value (OUT) in the LUT 131 (step S6 or S9). For example, when L*=1.2 is given as L data 101 prior to processing, $L_{LV}$=3 is obtained from the conversion equation in FIG. 13. This value (IN) is converted by the LUT 131 to 10 (OUT). This value is further converted to L*=25.5 corresponding to $L_{LV}$=10 by the conversion equation in FIG. 13.

Figure 36:
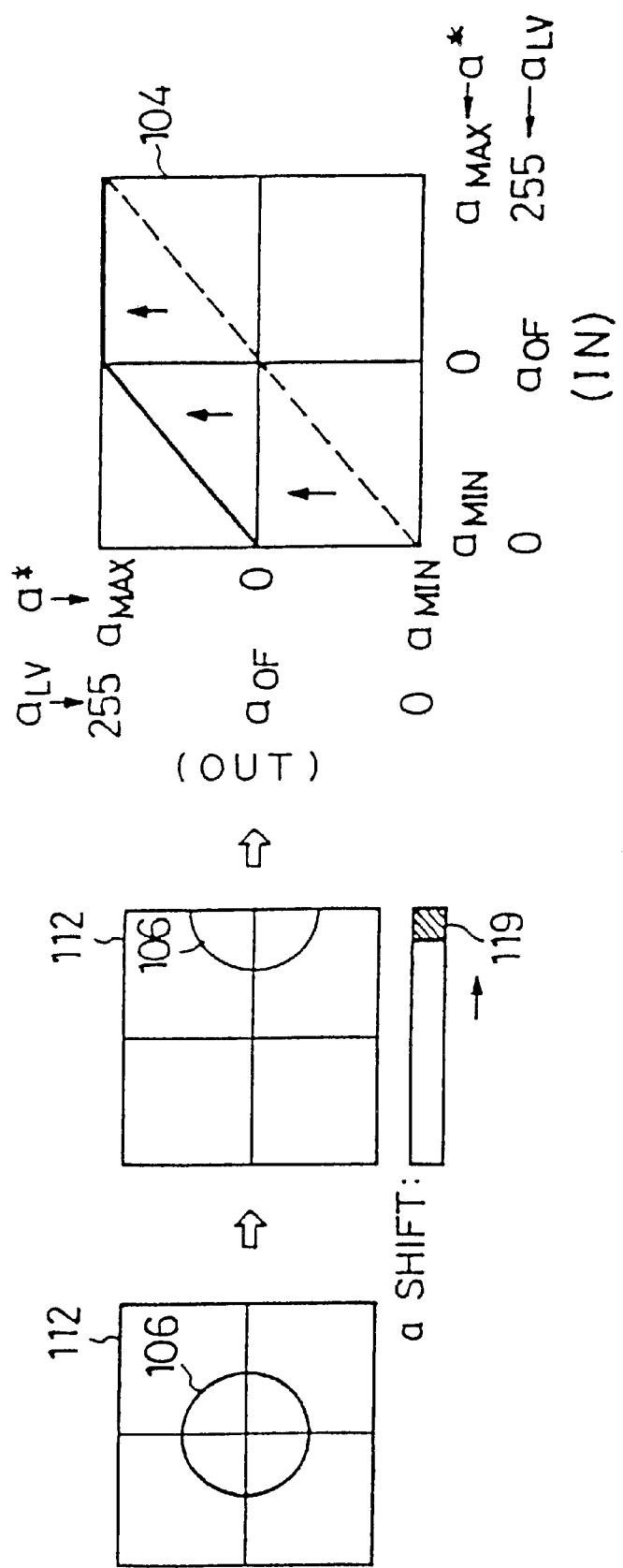
FIG. 36 is a diagram showing gradation conversion for shifting an a* value in the positive direction.
Figure 37:
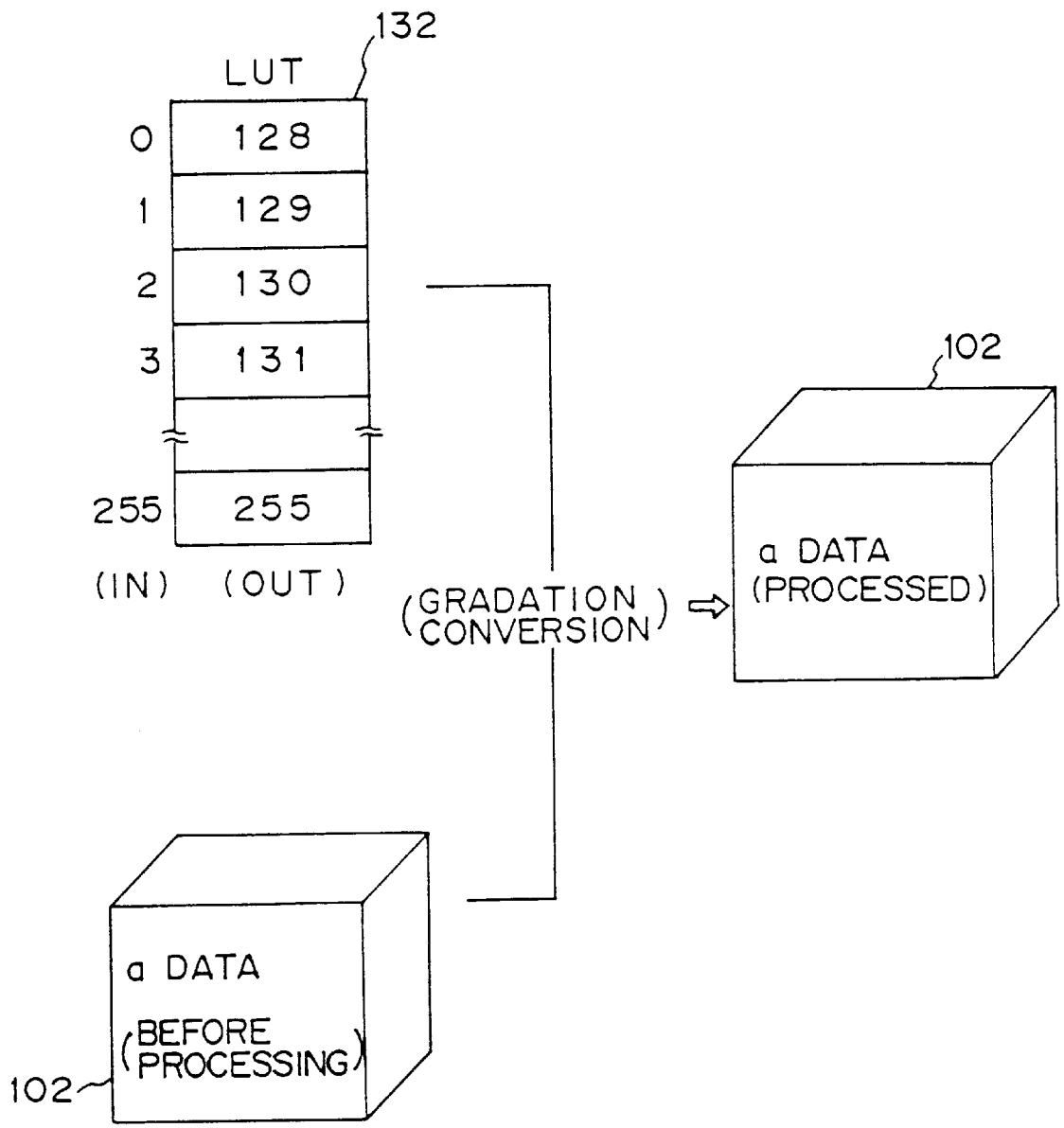
FIG. 37 is a diagram showing gradation conversion for shifting an a* value in the positive direction.

FIGS. 36 and 37 show an example of a gradation conversion process for shifting a* values in the positive direction. In this example, the lever 119 is maximally shifted in the positive direction as shown in FIG. 36, so that the reference circle 106 is shifted to the right end of the window 112 and displayed in half. At this point, a conversion curve 104 for a* data 102 is created on the basis of the shift amount of the reference circle 106. In this conversion curve 104, the input value (IN) and the output value (OUT) of a* data are both in the range [$a_{MIN}$, $a_{MAX}$], which corresponds to the interval [0, 255] of internal data $a_{LV}$. Here, the original conversion curve (shown by a broken line) is shifted upward to form a new conversion curve shown by a continuous line, so that the input values of $a_{LV}$ in the interval [$a_{OF}$, 255] are all converted to 255. When $a_{MIN}$=−128, $a_{MAX}$=127, and $a_{OF}$=128, an LUT 132 of FIG. 37 is obtained from the conversion curve 104 (step S63). In the gradation conversion process, each pixel value (IN) in input a data 102 is converted to a corresponding value (OUT) in the LUT 132 (step S6 or S9). For example, when a*=−128 is given as a data 102 prior to processing, it will correspond to $a_{LV}$=0 from the conversion equation of FIG. 13. By the LUT 132 of FIG. 37, this value is converted to OUT=128 corresponding to IN=0. This is value further converted by the conversion equation of FIG. 13 to a*=0.0 corresponding to $a_{LV}$=128.

Figure 38:
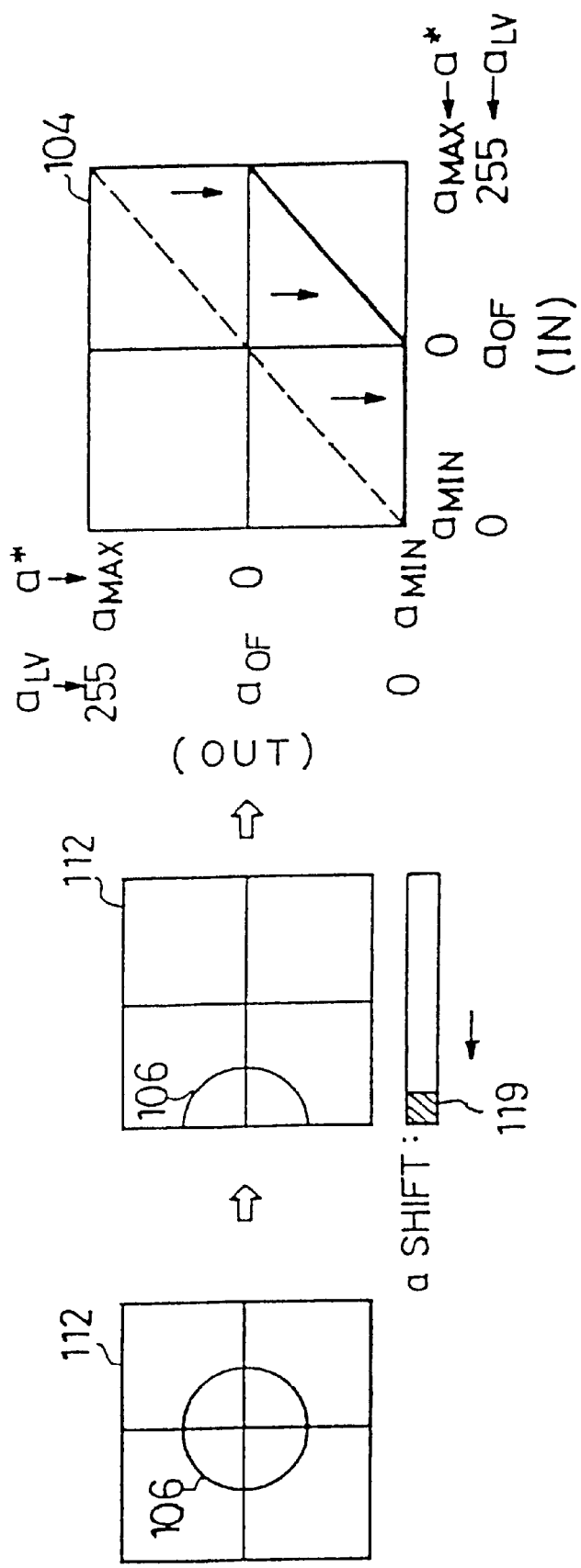
FIG. 38 is a diagram showing gradation conversion for shifting an a* value in the negative direction.
Figure 39:
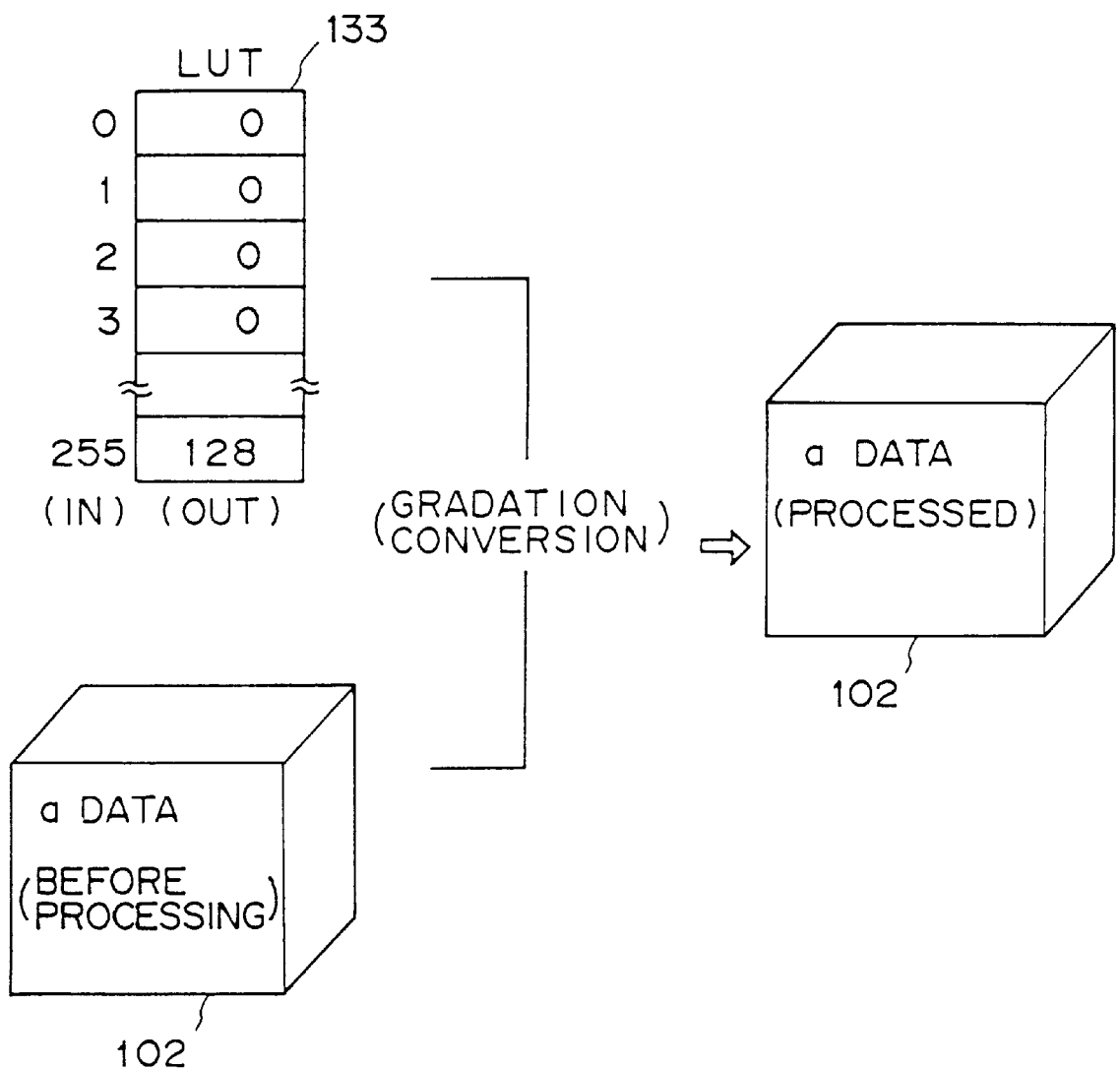
FIG. 39 is a diagram showing gradation conversion for shifting an a* value in the negative direction.

FIGS. 38 and 39 show an example of a gradation conversion process in which a* values are shifted in the negative direction. In this example, the lever 119 is maximally shifted in the negative direction as shown in FIG. 38, so that the reference circle 106 is shifted to the left end of the window 112. At this point, the original curve shown by a broken line is shifted downward to form a new conversion curve shown by a continuous line, so that the input values of $a_{LV}$ in the interval [0, $a_{OF}$] are all converted to 0. When $a_{MIN}$=−128, $a_{MAX}$=127, and $a_{OF}$=128, an LUT 133 shown in FIG. 39 is obtained from the conversion curve 104 (step S63). In the gradation conversion process, each pixel value (IN) in the input a data 102 is converted to a corresponding set value (OUT) in the LUT 133 (S6, S9).

Figure 40:
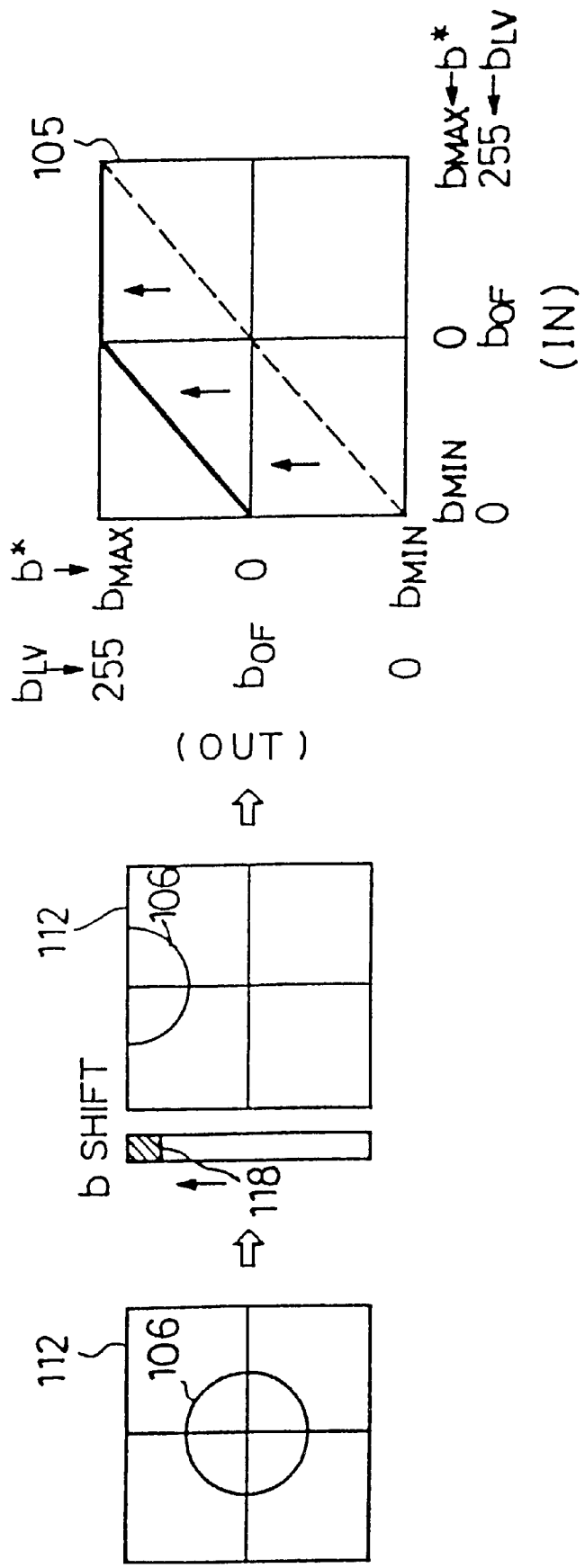
FIG. 40 is a diagram showing gradation conversion for shifting a b* value in the positive direction.
Figure 41:
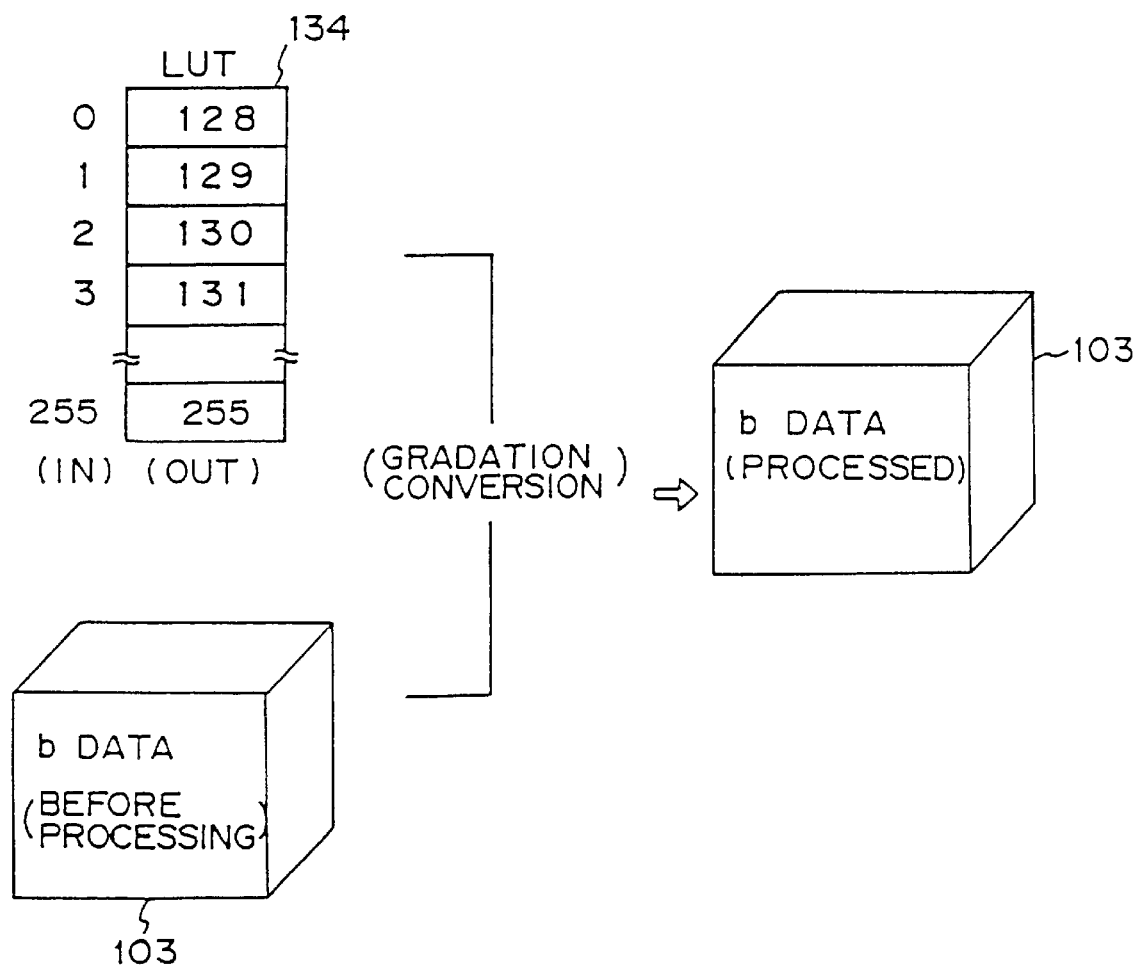
FIG. 41 is a diagram showing gradation conversion for shifting a b* value in the positive direction.

FIGS. 40 and 41 show an example of a gradation conversion process for shifting b* values in the positive direction. In this example, the lever 118 is maximally shifted in the positive direction as shown in FIG. 40, so that the reference circle 106 is shifted to the upper end of the window 112. At this point, a conversion curve 105 for b data 103 is created on the basis of the shift amount of the reference circle 106. In this conversion curve 105, the input value (IN) and the output value (OUT) of b* data are both in the range [$b_{MIN}$, $b_{MAX}$], which corresponds to the interval [0, 255] of the internal data $b_{LV}$. Here, the original conversion curve (shown by a broken line) is shifted upward to form a new conversion curve shown by a continuous line, so that the input values of $b_{LV}$ in the interval [$b_{OF}$, 255] are all converted to 255. When $b_{MIN}$=–128, $b_{MAX}$=127, and $b_{OF}$= 128, an LUT 134 of FIG. 41 is obtained from the conversion curve 105 (step S73). In the gradation conversion process, each pixel value (IN) in input b data 103 is converted to a corresponding set value (OUT) in the LUT 134 (step S6 or S9).

Figure 42:
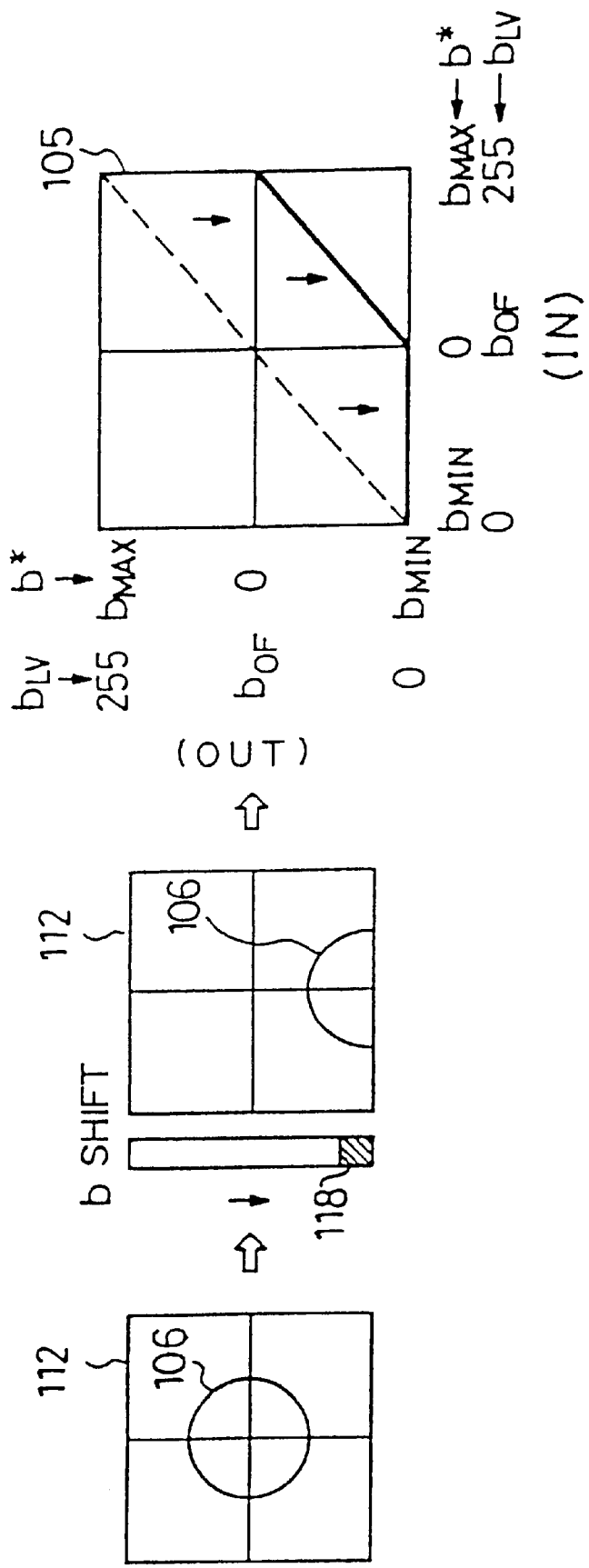
FIG. 42 is a diagram showing gradation conversion for shifting a b* value in the negative direction.
Figure 43:
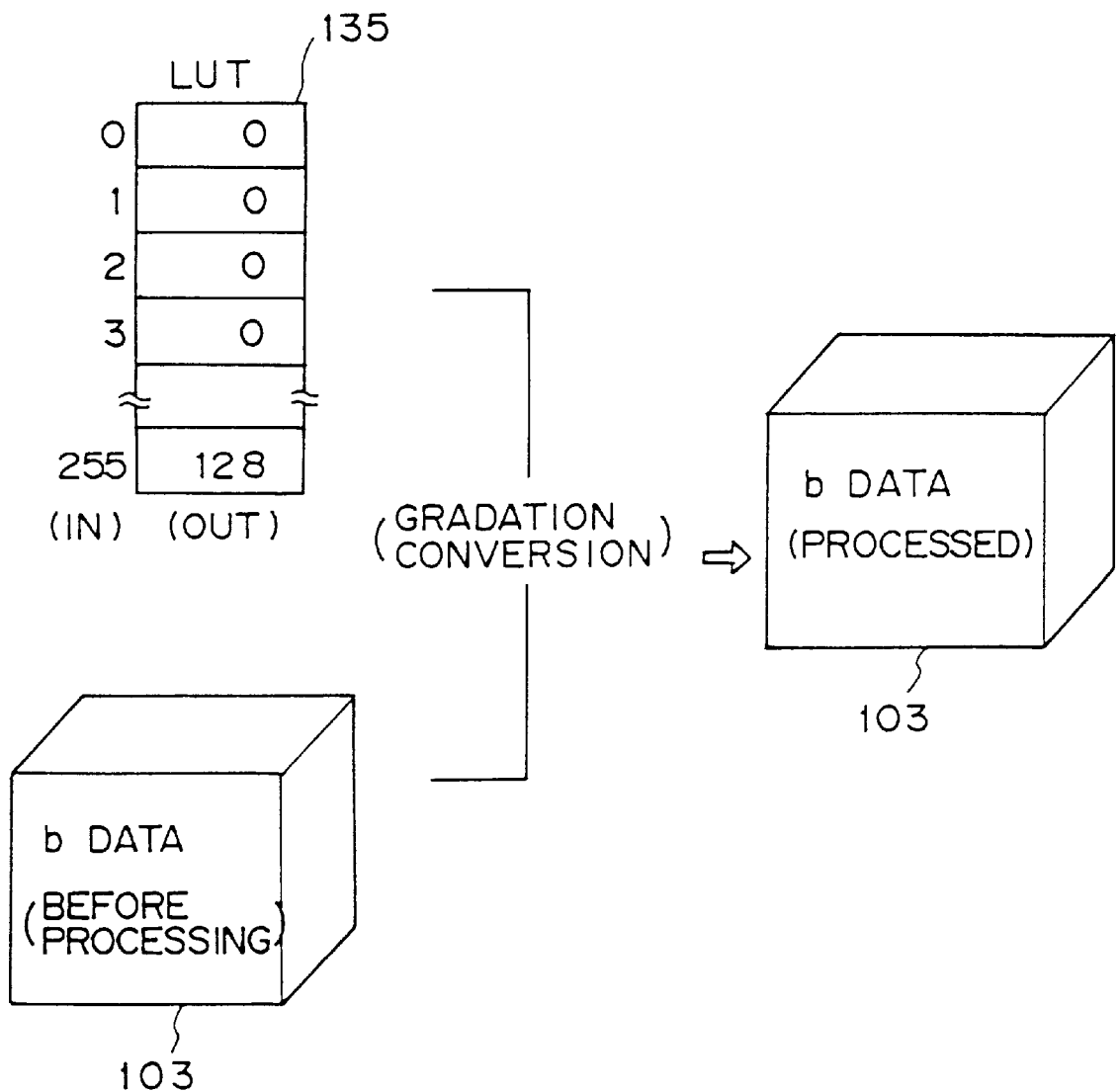
FIG. 43 is a diagram showing gradation conversion for shifting a b* value in the negative direction.

FIGS. 42 and 43 show an example of a gradation conversion process in which b* values are shifted in the negative direction. In this example, the lever 118 is maximally shifted in the negative direction as shown in FIG. 42, so that the reference circle 106 is shifted to the lower end of the window 112. At this point, the original curve shown by a broken line is shifted downward to form a new conversion curve shown by a continuous line, so that the input values of $b_{LV}$ in the interval [0, $b_{OF}$] are all converted to 0. When $b_{MIN}$=–128, $b_{MAX}$=127, and $b_{OF}$=128, an LUT 135 shown in FIG. 43 is obtained from the conversion curve 105 (step S73). In the gradation conversion process, each pixel value (IN) in the input b data 103 is converted to a corresponding set value (OUT) in the LUT 135 (S6, S9).

Figure 44:
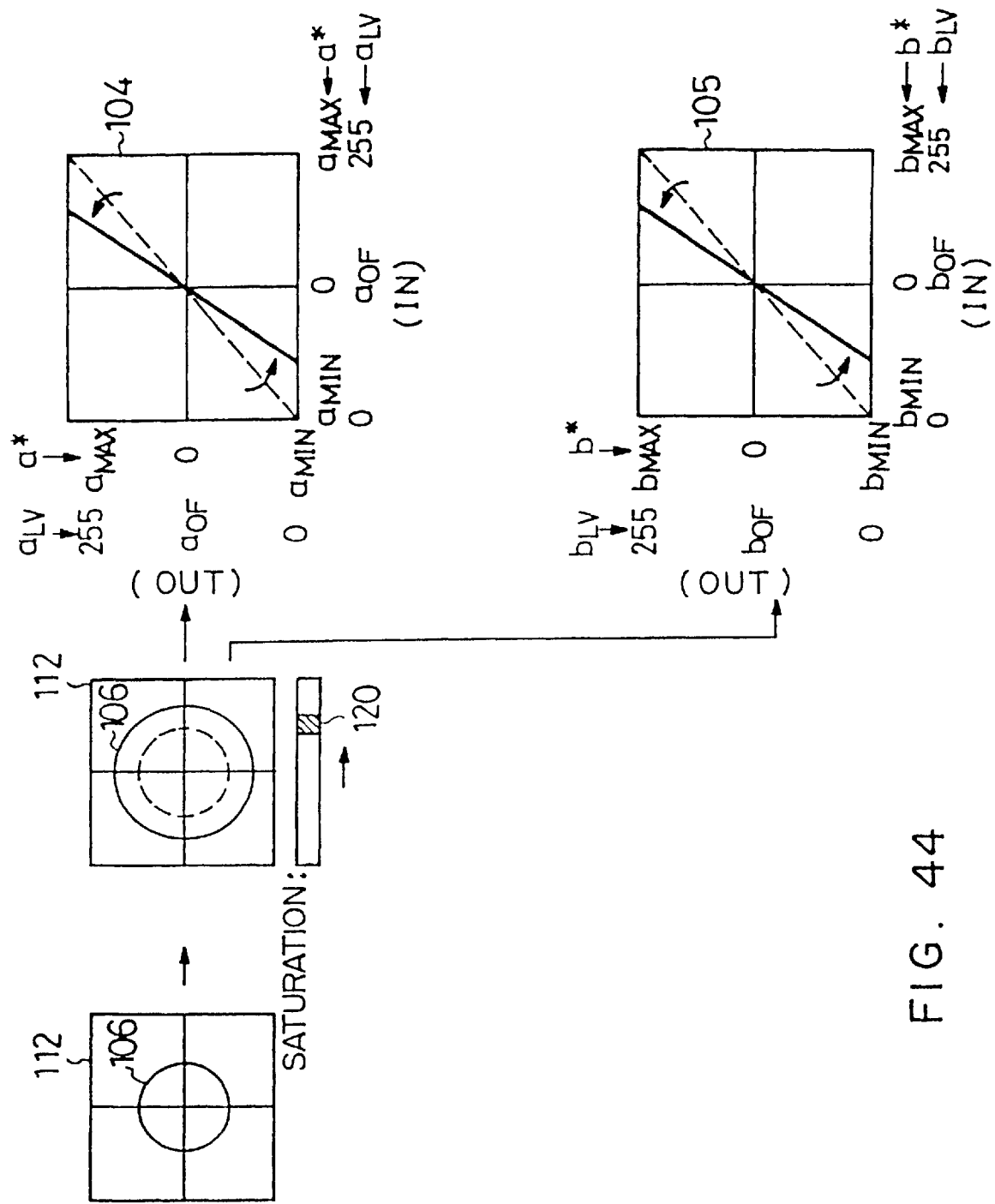
FIG. 44 is a diagram showing gradation conversion for enhancing saturation.
Figure 45:
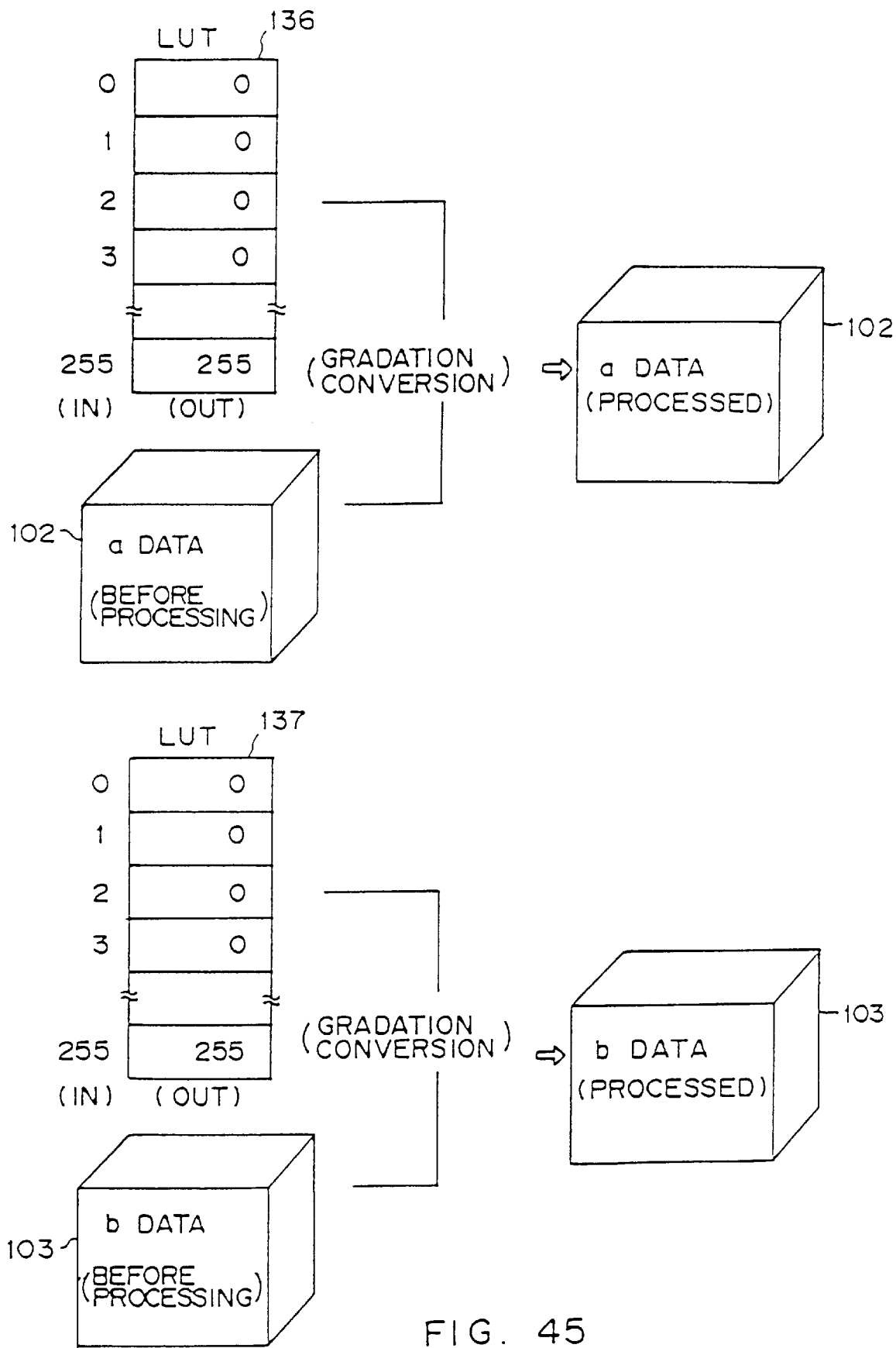
FIG. 45 is a diagram showing gradation conversion for enhancing saturation.

FIGS. 44 and 45 show an example of a gradation conversion process for enhancing saturation. In this example, the lever 120 is maximally shifted in the positive direction as shown in FIG. 44, so that the reference circle 106 becomes larger. At this point, a conversion curve 104 for a data 102 and a conversion curve 105 for b data 103 are created on the basis of the amount of variation in the size of the reference circle 106. In these conversion curves, the original conversion curves (shown by a broken line) are rotated counterclockwise to form new conversion curves shown by continuous lines. When $a_{MIN}$=–128, $a_{MAX}$=127, and $a_{OF}$=128, LUTs 136 and 137 of FIG. 45 are created on the basis of the conversion curves 104 and 105 (step S83). In the gradation conversion process, each pixel value (IN) in input a data 102 is converted to a corresponding set value (OUT) in the LUT 136 and each pixel value (IN) in input b data 103 is converted to a corresponding set value (OUT) in the LUT 137 (step S6 or S9).

When the lever 120 is fully shifted in the positive direction, the reference circle 106 is enlarged to touch the window 112 with the conversion curves 104 and 105 set vertically. At this time, the input value of $a_{LV}$ of the interval [0, $a_{OF}$] is converted into 0, and the input value of the interval [$a_{OF}$, 255] is converted into 255 using the conversion curve 104. The input value of $b_{LV}$ of the interval [0, $b_{OF}$] is converted into 0, and the input value of the interval [$b_{OF}$, 255] is converted into 255 using the conversion curve 105.

Figure 46:
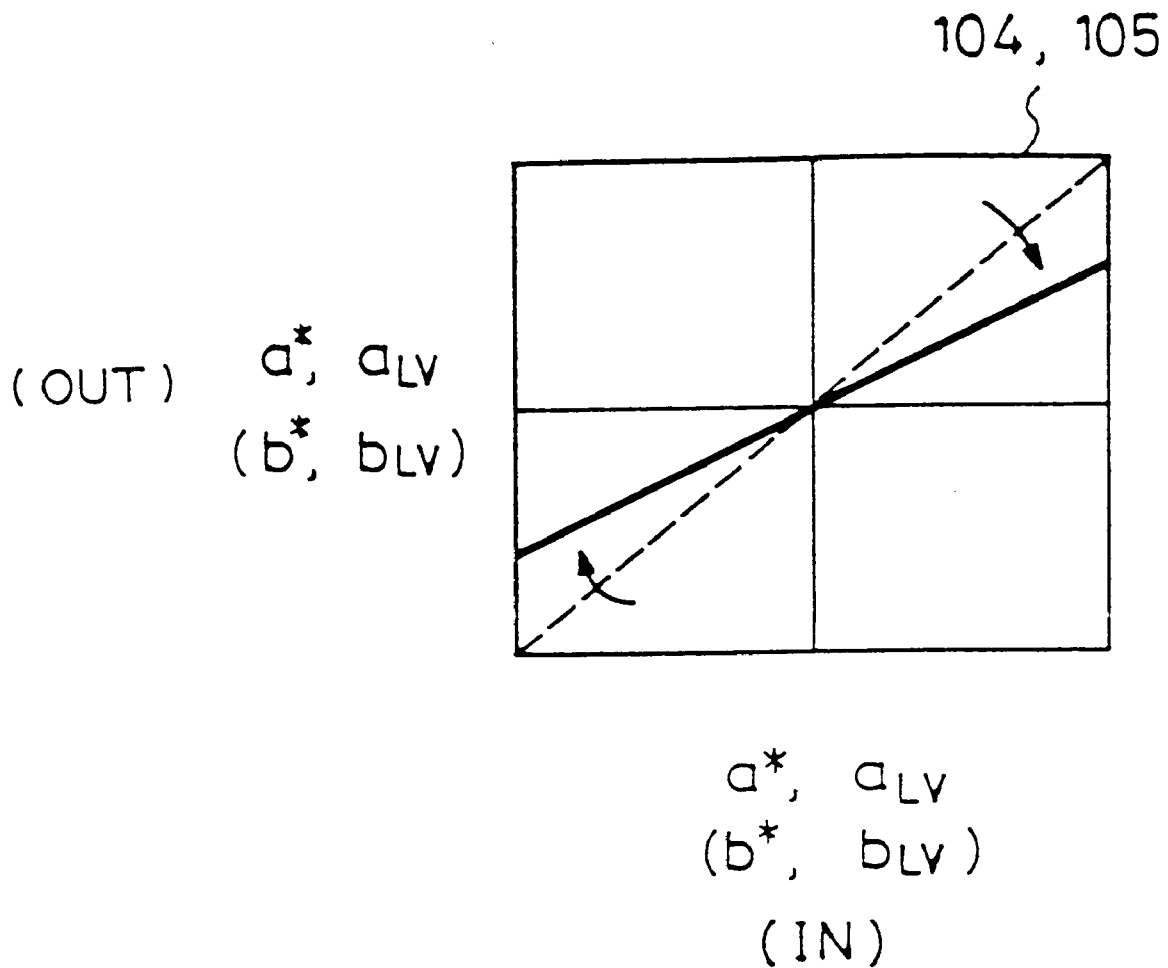
FIG. 46 is a diagram showing gradation conversion for lowering saturation.

The gradation conversion process for lowering the saturation by shifting the lever 120 in the negative direction is performed using the same procedure. In this case, the original curves 104 and 105 are rotated clockwise as shown in FIG. 46 to form new conversion curves. Using two LUTs created on the basis of the new conversion curves 104 and 105 each pixel value in a data 102 and b data 103 is converted. When the lever 120 is maximally shifted in the negative direction, the reference circle 106 reduces to its central point, so that the conversion curves 104 and 105 become horizontal. In this case, all input values of $a_{LV}$ are converted to $a_{OF}$ by the conversion curve 104 and all input values of $b_{LV}$ are converted to $b_{OF}$ by the conversion curve 105.

As described above, by expressing image data in terms of the Lab color space that is close to human sensation and displaying it graphically, operations of correcting color information become easy. In addition, since lightness and color tone components can be displayed separately for subsequent correction, the occurrence of color misregistration due to correction processing can be avoided.

Although, in the embodiment, image data in the Lab color space is used, this is illustrative and not restrictive. Any other color space can be used provided that it allows humans to directly grasp color information visually. For example, with the CIE-defined Luv color space in which u* and v* representing color tone information are used in addition to L* representing lightness information, it is necessary only to display a color tone graph on the u*v* plane.

Although, on the operating screen of FIG. 25, information on hue and saturation is displayed using a reference circle, any other shape of graph may be used. For example, the graph may take the shape of any polygon, such as square, equilateral octagon, or the like. In this case, to directly correct a* and b* values, the operator simply performs an operation of shifting the displayed polygon. To correct saturation, the operator simply performs an operation of changing the size of the polygon.

According to the invention, by displaying color information in image data graphically using a color space close to human sensation, the user can make corrections on color information sensationally, permitting a color picture to be retouched easily and quickly.

What is claimed is:

1. An image processing apparatus for use in an information processor for making color corrections on a color image, comprising:
   color space image storage means for storing image data in a color space which permits changes in the color image to be conjectured visually;
   interactive display means for accepting a request from a user to make a color correction on said image data as a whole;
   graph display means for graphically displaying the whole of the color correction on a coordinate space corresponding to the color space; and
   correction means responsive to said request accepted by said interactive display means for correcting said image data stored in said color space image storage means.

2. The image processing apparatus according to claim 1, wherein said color space image storage means stores said image data in the color space as represented by lightness information and color tone information.

3. The image processing apparatus according to claim 2, wherein said color space image storage means stores said image data in a Lab color space.

4. The image processing apparatus according to claim 2,
   wherein said color space image storage means stores said image data with a first coordinate representing said lightness information and second and third coordinates representing said color tone information, and
   wherein said graph display means displays a color tone graph representing a color tone of said image data on a two-dimensional plane containing said second and third coordinates.

5. The image processing apparatus according to claim 4, wherein said graph display means displays said color tone graph to represents hue information and saturation information.

6. The image processing apparatus according to claim 4, wherein said interactive display means accepts said request as a change to said color tone graph on said two-dimensional plane, and wherein said correction means changes said image data based on changes in said color tone graph.

7. The image processing apparatus according to claim 4, wherein said correction means changes said image data based on a change in position.

8. The image processing apparatus according to claim 4, wherein said correction means changes said image data based on a change in size of said color tone graph.

9. The image processing apparatus according to claim 4, wherein said correction means sets up a conversion table for said second coordinate based on a change in said color tone graph and changes said second coordinate using said conversion table.

10. The image processing apparatus according to claim 4, wherein said correction means sets up a conversion table for said third coordinate based on a change in said color tone graph and changes said third coordinate using said conversion table.

11. The image processing apparatus according to claim 4, wherein said graph display means displays a circle graph representing a color tone of said image data on said two-dimensional plane, wherein said interactive display means accepts said request to change said circle graph on said two-dimensional plane, and wherein said correction means changes said image data based on a change in said circle graph.

12. The image processing apparatus according to claim 4, wherein said graph display means further displays a conversion curve for gradation converting said first coordinate, wherein said interactive display means accepts a request to correct lightness, and wherein said correction means changes said first coordinate using said conversion curve.

13. A computer-readable storage medium storing instructions to direct a computer adapted to retouch a color image to perform operations, comprising:

displaying color information of image data in a coordinate space corresponding to a color space to depict colors in the color image;

accepting a request from a user to make a color correction on said image data as a whole;

graphically displaying the whole of the color correction in the coordinate space; and correcting said image data based on the request.

14. The storage medium according to claim 13 for use in directing the computer to further perform the operation of storing said image data in the color space as represented by lightness information and color tone information.

15. The storage medium according to claim 14 for use in directing the computer to further perform the operations of storing said image data with a first coordinate representing said lightness information and second and third coordinates representing said color tone information; and wherein said graphically displaying includes displaying a color tone graph representing a color tone of said image data on a two-dimensional plane containing said second and third coordinates.

16. A method of retouching a color image, comprising:

graphically displaying color information of image data in a coordinate space corresponding to a color space to depict colors in the color image;

making a correction request to make a color correction on said image data as a whole;

graphically displaying the whole of the color correction in the coordinate space; and correcting said image data based on the correction request.

17. The method according to claim 16, wherein said image data in the color space is represented by lightness information and color tone information.

18. The method according to claim 17, wherein said image data contains a first coordinate representing said lightness information and second and third coordinates representing said color tone information, and wherein said graphically displaying includes displaying a color tone graph representing a color tone of said image data on a two-dimensional plane containing said second and third coordinates.

* * * * *